United States Patent
Mizutani et al.

(10) Patent No.: US 6,756,697 B2
(45) Date of Patent: Jun. 29, 2004

(54) MOUNTING STRUCTURE INCLUDING COMMUNICATION SYSTEM FOR TRANSMITTING MULTIPLEX CONTROL SIGNAL TO VEHICLE ELECTRICAL DEVICES

(75) Inventors: Satoshi Mizutani, Nagoya (JP); Kazushi Shikata, Kariya (JP); Yoshio Shinoda, Obu (JP); Shigeto Tsuge, Okazaki (JP); Ikuo Hayashi, Okazaki (JP); Fumio Asakura, Okazaki (JP); Yuichi Watanabe, Tokyo (JP); Yutaka Matsuda, Tokyo (JP)

(73) Assignees: Denso Corporation, Kariya (JP); Nippon Soken, Inc., Nishio (JP); The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 10/133,878

(22) Filed: Apr. 26, 2002

(65) Prior Publication Data

US 2002/0158512 A1 Oct. 31, 2002

(30) Foreign Application Priority Data

Apr. 26, 2001 (JP) ........................................ 2001-130125
Nov. 15, 2001 (JP) ........................................ 2001-350438

(51) Int. Cl.[7] ............................... B60L 1/00; B60L 3/00
(52) U.S. Cl. ..................................................... 307/10.1
(58) Field of Search ............................... 307/9.1, 10.1; 361/683; 312/223.1, 223.4, 223.6; 248/550

(56) References Cited

U.S. PATENT DOCUMENTS

| | | | | |
|---|---|---|---|---|
| 5,694,335 A | * | 12/1997 | Hollenberg | 713/201 |
| 5,852,613 A | * | 12/1998 | Nagatani et al. | 370/546 |
| 5,893,478 A | * | 4/1999 | Maruoka | 16/354 |
| 6,114,776 A | * | 9/2000 | Ito et al. | 307/10.1 |
| 6,163,079 A | * | 12/2000 | Miyazaki et al. | 307/10.1 |
| 6,361,196 B1 | * | 3/2002 | Boucheron et al. | 362/546 |
| 6,370,037 B1 | * | 4/2002 | Schoenfish | 361/807 |
| 6,381,133 B1 | * | 4/2002 | Chen | 361/686 |
| 6,407,709 B1 | * | 6/2002 | Hanshew | 343/702 |
| 6,441,510 B1 | * | 8/2002 | Hein et al. | 307/10.1 |
| 6,496,141 B2 | * | 12/2002 | Pippin | 342/357.08 |
| 6,529,381 B1 | * | 3/2003 | Schoenfish | 361/725 |

* cited by examiner

*Primary Examiner*—Gregory J. Toatley, Jr
(74) *Attorney, Agent, or Firm*—Harness, Dickey & Pierce, PLC

(57) ABSTRACT

A mounting structure for mounting accessories on a designed interior member in a vehicle compartment includes a plurality of mounting portions. Each of the mounting portions includes a non-contact type power sending terminal and a vehicle-side antenna. The mounting portion transmits power from the battery of the vehicle via the non-contact type power sending terminal, and further transmits a multiplex signal that includes all the control signals required for controlling a plurality of accessories via the vehicle-side antenna. A user can mount an accessory arbitrarily selected from the plurality of accessories on any of the mounting portions without newly installing the required wiring, and therefore readily replace the accessories mounted on the mounting portions.

61 Claims, 18 Drawing Sheets

US 6,756,697 B2

MOUNTING STRUCTURE INCLUDING COMMUNICATION SYSTEM FOR TRANSMITTING MULTIPLEX CONTROL SIGNAL TO VEHICLE ELECTRICAL DEVICES

CROSS REFERENCE TO RELATED APPLICATION

The present application is based on and incorporates herein by reference Japanese Patent Applications No. 2001-130125 filed on Apr. 26, 2001 and No. 2001-350438 filed on Nov. 15, 2001.

BACKGROUND OF THE INVENTION

1. Field of the Invention

The present invention relates to a mounting structure for mounting vehicle electrical devices on an interior member such as an instrument panel.

2. Related Art

In a vehicle, accessories (electrical devices) such as a battery charger for a mobile phone, the display of navigation equipment and a tachometer, which operate based on electrical signals received from the vehicle, are mounted on mounting portions of an interior member such as an instrument panel. It is proposed that a mounting structure for mounting the accessories on the mounting portions includes wiring for transferring the electrical signals to the respective accessories.

Therefore, when a user replaces one of the accessories with another accessory to taste, he/she should newly install the required wiring. However, this wiring work requires some technique. Accordingly it is difficult for the user to replace the accessories.

SUMMARY OF THE INVENTION

The present invention has an object to provide a mounting structure for mounting electrical devices on mounting portions of an interior member of a vehicle, which enables a user to readily replace the electrical devices.

A mounting structure according to the present invention includes a mounting portion on which an electrical device arbitrarily selected from a plurality of vehicle electrical devices is mounted. The mounting portion is disposed on an interior member in a vehicle compartment, and includes communication means for transmitting a multiplex signal into which a plurality of control signals for controlling the respective vehicle electrical devices are multiplexed to the electrical device mounted on the mounting portion.

Preferably, the mounting portion includes non-contact type power transmission means, and transmits power from the battery of the vehicle to the electrical device mounted thereon via the power transmission means without touching the electrical device. The communication means transmits the multiplex signal to the electrical device via radio waves. Further the mounting portion includes mounting means which enables a user to mount the electrical device on the mounting portion in a single procedure. Moreover, preferably, the mounting structure includes a plurality of mounting portions each of which is similar to the above mounting portion. The interior member is an instrument panel, and a cover member is detachably mounted on the top surface of the instrument panel. The mounting portions are arranged on the cover member.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
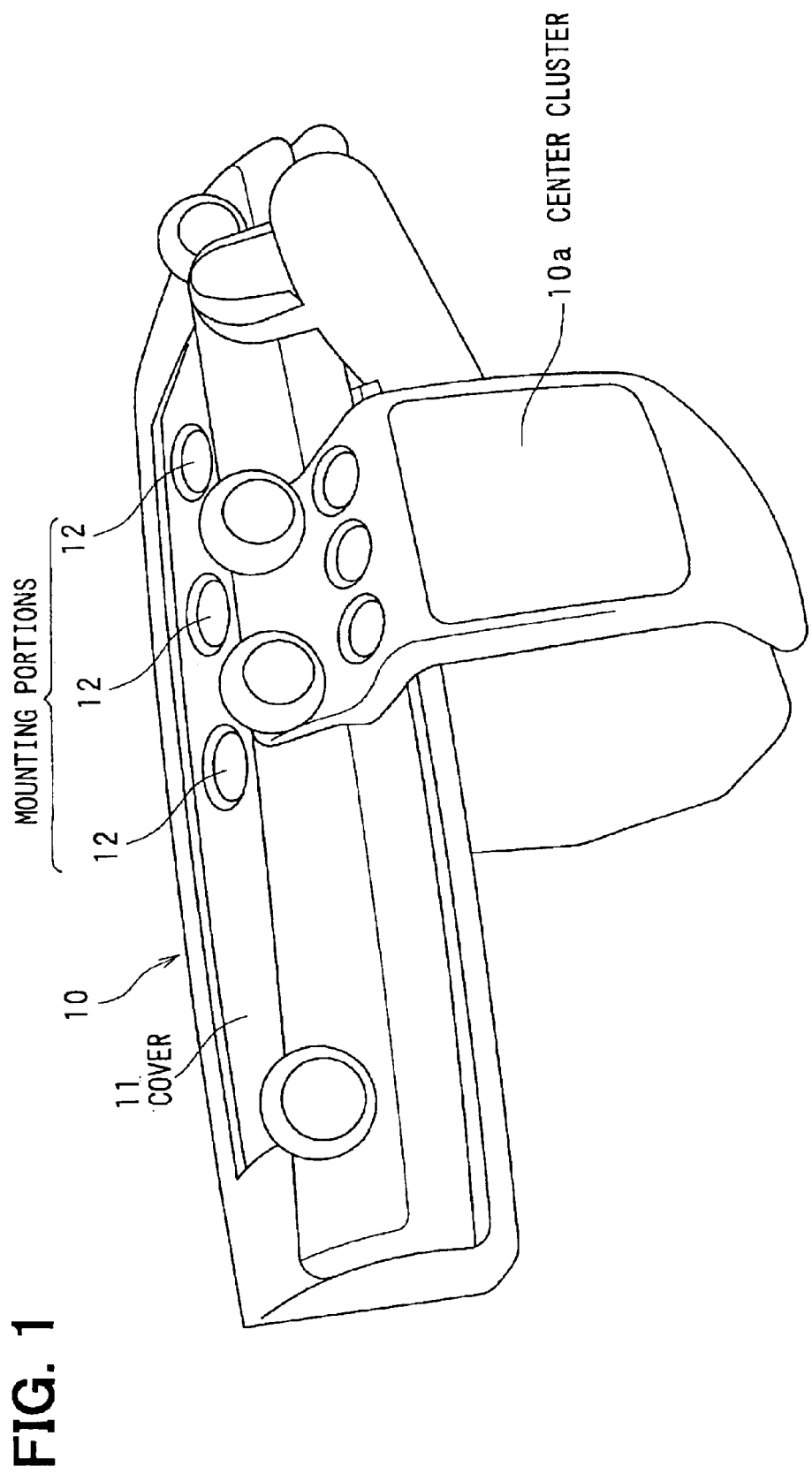
FIG. 1 is a perspective diagram showing an instrument panel in which a mounting structure according to a first embodiment of the present invention is incorporated.
Figure 2:
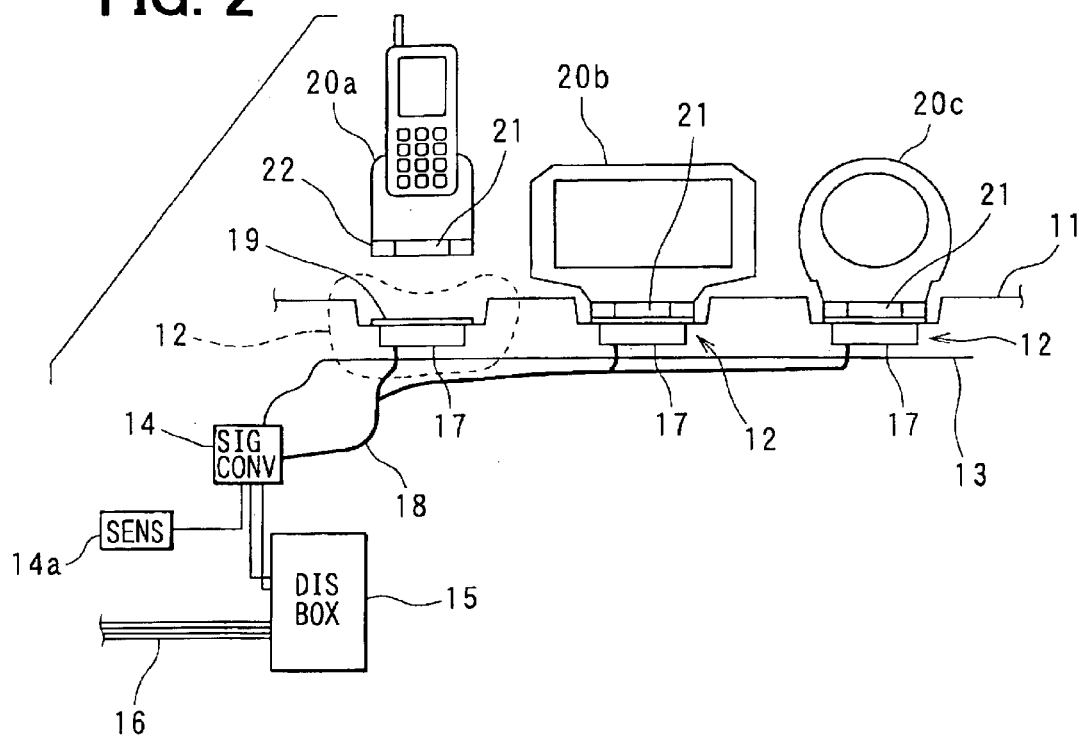
FIG. 2 is a schematic diagram showing how accessories mounted on the mounting portions of the mounting structure are electrically connected to the electric circuit of a vehicle according to the first embodiment.

Referring to FIG. 1, a mounting structure according to a first embodiment of the present invention is used for mounting accessories on the instrument panel 10 of a vehicle. A cover member 11 is detachably attached to the top of the instrument panel 10. The cover member 11 includes three mounting portions 12, which are arranged in the width direction as shown in FIG. 1. Accessories (i.e., electrical devices) 20a, 20b, 20c, which operate based on electrical control signals received from the vehicle, are mounted on the respective mounting portions 12 as shown in FIG. 2. The accessories 20a, 20b, 20c are a charging apparatus such as two in one hands-free device and battery charger for a mobile phone, a display unit such as a display for navigation equipment, and an instrument such as a tachometer, respectively.

The battery charger 20a receives a first electrical control signal from the vehicle, and operates based on the first control signal. The first control signal is, for example, a speech signal which is received via a hands-free microphone. The display 20b receives a second electrical control signal which includes navigation information from the vehicle, and operates based on the second control signal. The vehicle receives the second control signal from the navigation equipment installed on the center cluster 10a of the instrument panel 10. The tachometer 20c receives a third electrical control signal which includes information on the engine speed and the like from an engine ECU of the vehicle, and operates based on the third control signal.

A vehicle-side antenna 13 is provided as communication means inside the instrument panel 10 so as to extend in the width direction as shown in FIG. 2. Each of the accessories 20a, 20b, 20c includes an accessory-side antenna. Thereby two-way radio communication between the vehicle and each of the accessories 20a, 20b, 20c is possible. The radio communication is performed using signals (e.g., FM signals) which do not interfere with AM radio waves from a radio set.

The vehicle-side antenna 13 is connected to a signal converter 14 disposed inside the instrument panel 10. The signal converter 14 is in turn connected to a distribution box 15 such as a junction box which is connected to various parts of the vehicle via a wire harness 16. For example, the wire harness 16 connects between the electric circuit of an engine compartment and the electric circuit of a vehicle compartment, between the electric circuit of the vehicle compartment and the electric circuit of the instrument panel 10, and between the electric circuit of the instrument panel 10 and the electric circuit of a rear seat. The wire harness 16 transfers the electrical signals among those electric circuits and supplies power to those electric circuits.

Each of the accessories 20a, 20b, 20c always transmits a coded signal to the signal converter 14, when the accessory 20a, 20b, 20c is ON. The signal converter 14 determines which of the first, second and third electrical control signals should be transferred to the accessories 20a, 20b, 20c based on the coded signals. Then the signal converter 14 selects the signals, which should be transferred to the accessories 20a, 20b, 20c, from various signals which are transferred from the vehicle to the junction box 15. The signal converter 14 multiplexes the selected signals into a multiplex signal, and transmits the multiplex signal to the accessories 20a, 20b, 20c via the vehicle-side antenna 13.

Each of the accessories 20a, 20b, 20c receives the multiplex signal via the accessory-side antenna, and extracts the required control signal from the multiplex signal. For example, the tachometer 20c extracts the third control signal from the multiplex signal, and then operates based on the extracted third control signal.

If a sensor 14a such as a gyroscope is added to the navigation equipment, the sensor 14a is connected to the signal converter 14. Then the signal converter 14 multiplexes a sensor signal from the sensor 14a together with the first, second and third electrical control signals into a multiplex signal, and transmits the multiplex signal via the vehicle-side antenna 13. Thus the sensor 14a can be readily added on.

Figure 3:
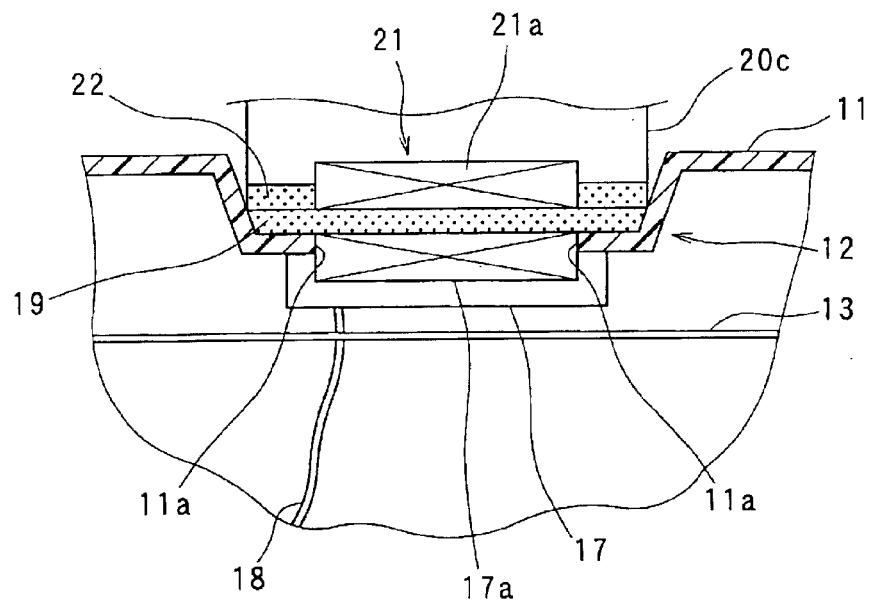
FIG. 3 is across section diagram showing the mounting structure according to the first embodiment.

The mounting portions 12 for the respective accessories 20a, 20b, 20c have exactly the same construction. Therefore only the mounting portion 12 for the tachometer 20c will be explained. Referring to FIGS. 3 and 4A, the mounting portion 12 is a circular recess formed on the cover member 11. The accessory 20c includes a disc-shaped raised portion, which is disposed in the recess when the accessory 20 is mounted on the mounting portion 12.

The mounting portion 12 includes a non-contact type power sending terminal 17 as non-contact type power transmission means, which is connected to the battery of the vehicle by a wire harness 18 for power transmission. The power sending terminal 17 includes a disc-shaped primary coil 17a, which is fit into a circular hole 11a formed on the bottom of the recess. The mounting portion 12 further includes, as mounting means, a circular fastener member 19 made of fabric fastener tape like VELCRO® hook and loop fasteners, which is glued to the bottom of the recess. The circular fastener member 19 covers the primary coils 17a, and thereby the primary coil 17a is not exposed to the vehicle compartment when the accessory 20c is not mounted on the mounting portion 12. Thus the good appearance of the instrument panel 10 is ensured even when the accessory 20c is mounted on the mounting portion 12.

On the other hand, the accessory 20c includes a non-contact type power receiving terminal 21 on the bottom of the raised portion. The power receiving terminal 21 includes a disc-shaped secondary coil 21a, which is exposed when the accessory 20c is not mounted on the mounting portion 12. The accessory 20c further includes, as mounting means, an annular fastener member 22 made of resinous fastener tape like VELCRO® hook and loop fastener on the bottom of the raised portion. The annular fastener member 22 surrounds the exposed portion of the secondary coil 21a.

Figure 4B:
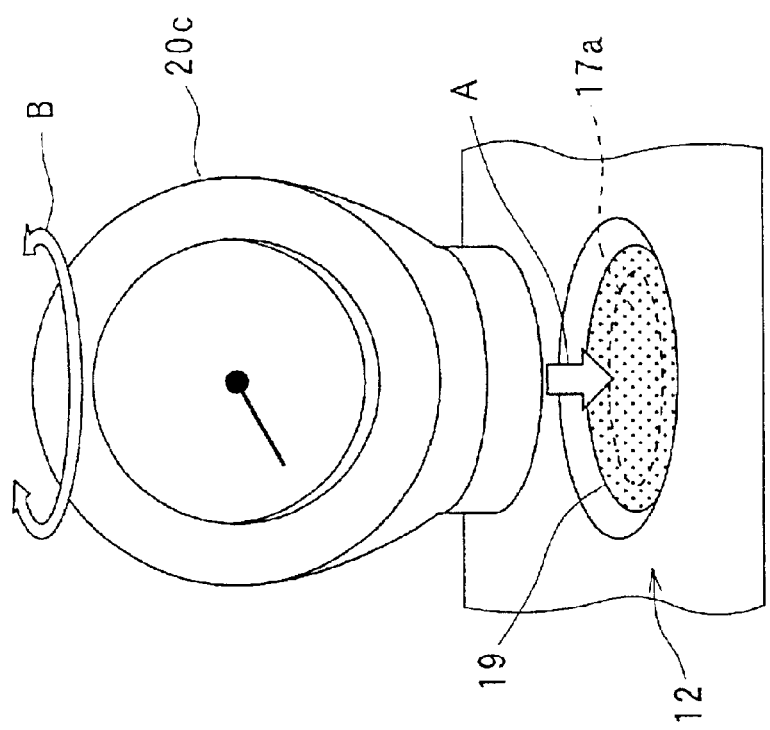
FIG. 4B is a perspective diagram showing how an accessory is mounted on the mounting portion of the mounting structure according to the first embodiment.
Figure 4A:
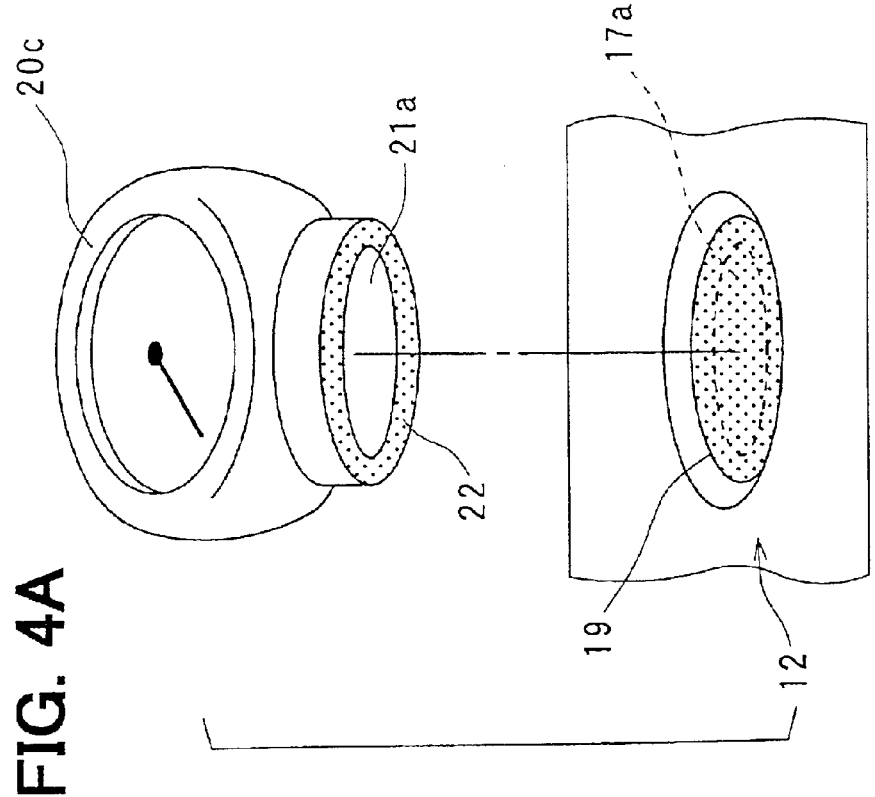
FIG. 4A is a perspective diagram showing a mounting portion of the mounting structure according to the first embodiment.

Referring to FIG. 4B, when a user mounts the accessory 20c on the mounting portion 12, he/she places the accessory 20c on the mounting portion 12 as indicated by arrow A so that the raised portion of the accessory 20c is disposed in the recess of the mounting portion 12. Further the user presses down the accessory 20c against the bottom of the recess so that the annular fastener member 22 of the accessory 20c is fastened to the circular fastener member 19 of the mounting portion 12. Thus the accessory 20c is fixed to the mounting portion 12 of the cover member 11.

The primary and secondary coils 17a, 21a are arranged so that the axes of the coils 17a, 21a extend in the direction of arrow A and the coils 17a 21a are close and parallel to each other when the accessory 20c is mounted on the mounting portion 12. A direct current from the battery of the vehicle is applied to the power sending terminal 17. Then the power sending terminal 17 converts the direct current applied thereto into an alternating current of a high frequency, and applies the alternating current to the primary coil 17a. In response, an alternating current is generated in the secondary coil 21 of the power receiving terminal 21 by the law of electromagnetic induction. Thus the power sending terminal 17 transmits the power received from the battery to the power receiving terminal 21 without touching the power receiving terminal 21.

It is preferable that the secondary coil 21a is arranged within a distance of 2 or 3 mm from the primary coil 17a so that the power is efficiently transmitted from the power sending terminal 17 to the power receiving terminal 21. According to the present embodiment, the secondary coil 21a can be disposed within a distance of 2 or 3 mm, because the annular fastener member 22 does not cover the secondary coil 21a.

The power sending terminal 17 includes a power consumption detector in its electric circuit. If the user carelessly places a piece of metal such as a juice can on the mounting portion 12, the juice can may be heated up by the power sending terminal 17 and thereby the amount of consumed power may increase abnormally. In order to prevent such abnormality, the power consumption detector measures the amount of power consumed by the power sending terminal 17. When the measured amount of the consumed power reaches a predetermined upper threshold, it is determined that the mounting portion 12 is in an unusual situation and therefore transmission of the power to the accessory 20c is suppressed. On the other hand, when the measured amount of consumed power is lower than a predetermined lower threshold, it is determined that the accessory 20c is not mounted on the mounting portion 12 and therefore transmission of the power to the accessory 20c is also suppressed for saving of power.

The effects of the present embodiment are as follows. According to the present embodiment, the first, second and third control signals required for the accessories 20a, 20b, 20c are all multiplexed into a multiplex signal, and the multiplex signal is transmitted to the accessories 20a, 20b, 20c via the vehicle-side antenna 13. Therefore the user can readily mount an accessory arbitrarily selected from the plurality of accessories 20a, 20b, 20c on a mounting portion arbitrarily selected from the plurality of mounting portions 12 to taste without newly installing the required wiring in the mounting portions 12.

Further the power sending terminal 17 transmits power to the accessory 20c without touching the accessory 20c, and transmits the control signals to the accessory 20c via radio waves. Therefore the accessories 20a, 20b, 20c are not required to be connected to the mounting portion 12 by cables. This enables the user to readily replace the accessories 20a, 20b, 20c. Moreover, the power sending and receiving terminals 17, 21 are immune to damage, because they are non-contact type. In contrast, contact-type terminals are subject to damage.

Furthermore, according to the present embodiment, the user can mount the accessory 20c on the mounting portion 12 positioning the accessory 20c properly, because the recess of the mounting portion 12 and the raised portion of the accessory 20c are circular and disc-shaped, respectively. Further the accessory 20c may be mounted facing in an arbitrary direction as indicated by arrow B in FIG. 4B, because the primary and secondary coils 17a, 21a are disc-shaped.

The accessory 20c is fixed to the mounting portion 12 by fastening the annular fastener member 22 of the accessory 20c to the circular fastener member 19 of the mounting portion 12. Therefore, the user can further readily mount the accessory 20a, 20b, 20c on the mounting portion 12 so that the accessory 20c faces in an arbitrary direction as indicated by arrow B in FIG. 4B.

If screws are employed for fixing the accessory 20c to the mounting portion 12 instead of the fastener members 19, 22, holes are bored in the mounting portion 12 and therefore the holes should be backfilled after the accessory 20a, 20b, 20c is dismounted from the mounting portion 12. Further the commercial value of the vehicle in the secondhand car market is reduced in this case. In contrast, according to the present embodiment, the user can mount the accessory 20c on the mounting portion 12 without boring holes. Accordingly the user is not required to perform backfilling after he/she dismounts the accessory 20c from the mounting portion 12 and the commercial value of the vehicle is not reduced.

The fastener members 19, 22 are not heated up even when a current is applied to the primary coil 17a, because the fastener members 19, 22 are made of nonmagnetic materials. In contrast, if magnetic fastener members are employed instead, they are heated up due to the electromagnetic induction when a current is applied to the primary coil 17a.

According to the present invention, the accessories 20a, 20b, 20c are supported steady from the below and further the display 20b and the tachometer 20c are clearly visible to the user, because the instrument panel 10 is selected as an interior member on which the accessories 20a, 20b, 20c are mounted. Further the mounting portions 12 are formed on the cover member 11 detachably attached to the top of the instrument panel 10. Therefore the vehicle may be equipped with the mounting portions 12 at the user's option after the vehicle comes onto the market.

The signal converter 14 disposed inside the instrument panel 10 selects the first, second, and third control signals from various signals, and transmits a multiplex signal which includes only the selected signals to the accessories 20a, 20b, 20c via the vehicle-side antenna 13. Therefore each of the accessories 20a, 20b, 20c can readily extract the required signal from the multiplex signal.

Further according to the present embodiment, the vehicle can perform two-way communication with each of the accessories 20a, 20b, 20c. Therefore information from one of the accessories 20a, 20b, 20c can be transmitted to another via the signal converter 14. For example, information on incoming calls received by a mobile phone can be transmitted from the battery charger 20a to the display 20b of the navigation equipment, and then displayed. Further information on the engine speed can be transmitted from the tachometer 20c to the display 20b of the navigation equipment, and then displayed.

Second Embodiment

Figure 5:
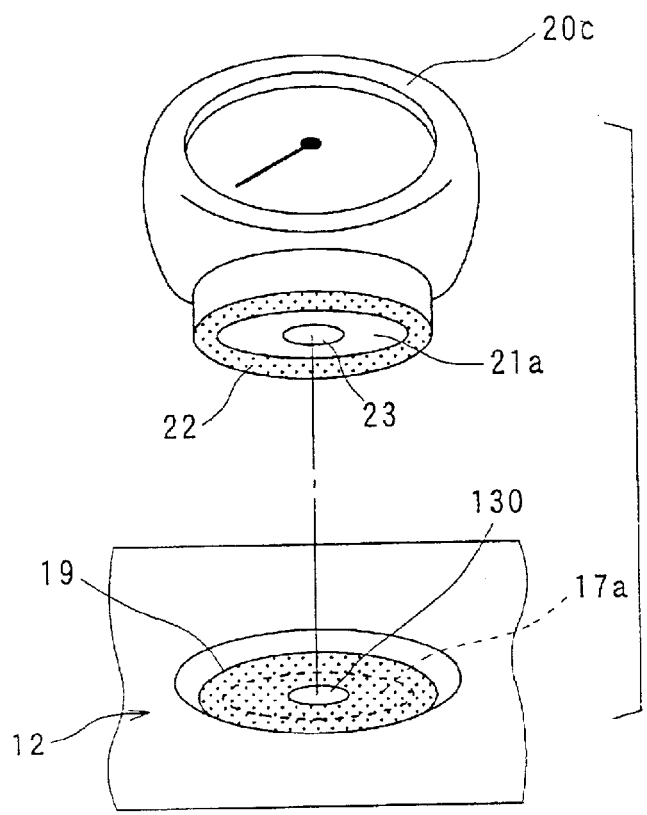
FIG. 5 is a perspective diagram showing a mounting structure according to a second embodiment of the present invention.
Figure 6:
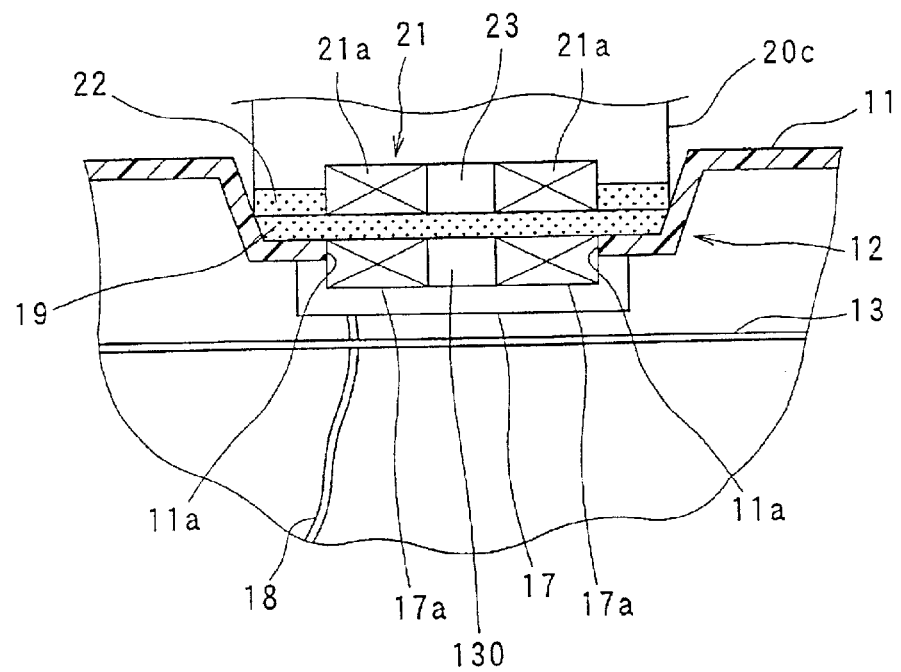
FIG. 6 is a cross-section diagram showing the mounting structure according to the second embodiment.

Referring to FIGS. 5 and 6, a mounting structure according to a second embodiment of the present invention includes non-contact type power sending and receiving terminals 17, 21, which are similar to those included in the mounting structure according to the first embodiment, in a mounting portion 12 of a cover member 11 and an accessory 20c, respectively. The mounting portion 12 includes a first infrared transceiver 130 at the center of a doughnut-shaped primary coil 17a of the power sending terminal 17, while the accessory 20c includes a second infrared transceiver 23 at the center of a doughnut-shaped secondary coil 21a of the power receiving terminal 21. Thereby two-way infrared communication can be performed between the vehicle and the accessory 20c via infrared light. The first, second and third control signals are transmitted from the first transceiver 130 to the second transceiver 23.

Thus the required control signals are transmitted to the accessories 20a, 20b, 20c via infrared light according to the present embodiment, while they are transmitted via radio waves of a FM frequency according to the first embodiment. Therefore the mounting structure according to the present embodiment does not include the vehicle-side antenna 13, which is included in the mounting structure according to the first embodiment. The other portions of the mounting structure according to the present embodiment are the same as the first embodiment, and the mounting portions 12 are connected to the electric circuit of the vehicle in a manner similar to the first embodiment.

According to the first embodiment, the FM signals transmitted via the vehicle-side antenna 13 would interfere with FM signals transmitted via a vehicle-side antenna 13 of another vehicle. According to the present embodiment, such interference is prevented because the control signals are transmitted via infrared light.

Further according to the present embodiment, the single signal converter 14 is disposed inside the instrument panel for transmitting all the required control signals to the first infrared transceiver 130. Therefore the number of parts included in the mounting structure is reduced and wiring installed between a junction box 15 and the signal converter 14 can be simple in comparison with the case that a plurality of signal converters corresponding to the respective mounting portions 12 are included in the mounting structure. Further a new mounting portion can be easily added on, and therefore the mounting structure according to the present embodiment can be used for various types of vehicles in common.

Third Embodiment

Figure 7:
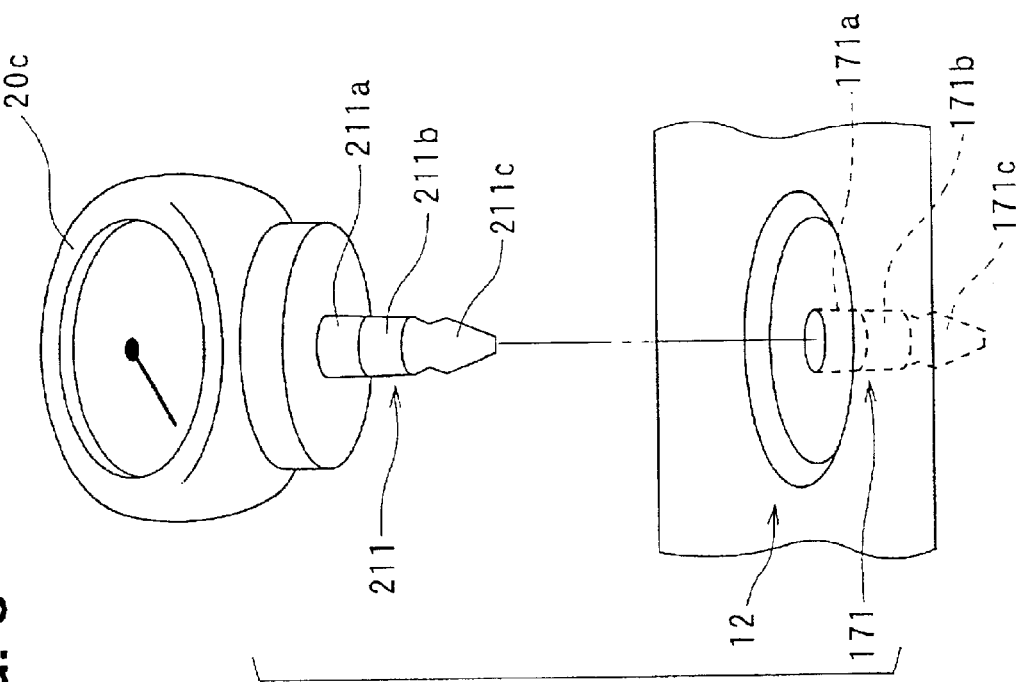
FIG. 7 is a perspective diagram showing a mounting structure according to a third embodiment of the present invention.

Referring to FIG. 7, a mounting structure according to a third embodiment of the present invention includes two contact-type power sending terminals 170 in a mounting portion 12 of a cover member, and further includes two contact-type power receiving terminals 210 on an accessory 20c. The power sending terminals 170 are an anode terminal and a cathode terminal, respectively. The power receiving terminals 210 are also an anode terminal and a cathode terminal, respectively. The power sending terminals 170 are plate type terminals which are arranged on the inner wall of a circular recess of the mounting portion 12 so that the anode terminal is opposite to the cathode terminal across the diameter of the recess. The power receiving terminals 210 are spring type terminals which are arranged on the outer wall of a disc-shaped raised portion of the accessory 20c so that the anode terminal is opposite to the cathode terminal across the diameter of the raised portion.

When the accessory 20c is mounted on the mounting portion 12, the power receiving terminals 210 come into contact with the power sending terminals 170. Then power from the battery of a vehicle is transmitted to the accessory 20c via the terminals 170, 210. Thus the power is transmitted to the accessory 20c via the contact-type terminals 170, 210 according to the present embodiment, while the power is transmitted via non-contact type terminals 17, 21 according to the first or second embodiment. According to the present embodiment, the accessory 20c can be mounted on the mounting portion 12 facing in an arbitrary direction within an angle slightly less than 180°. The aspect of the accessory 20c is thus limited because the mounting portion 12 and the accessory 20c each include the anode terminal and the cathode terminal.

The other portions of the mounting structure according to the present embodiment are the same as the second embodiment, and the mounting portions 12 are connected to the electric circuit of the vehicle in a manner similar to the second embodiment.

The effects of the present embodiment are as follows. A power transmission mechanism which employs contact type terminals as shown in the present embodiment is inexpensive in comparison with a power transmission mechanism which employs non-contact type terminals.

Further according to the present embodiment, since spring terminals are employed as the power receiving terminals 210, the terminals 210, 170 are more immune to damage when the accessory 20c is mounted on or dismounted from the mounting portion 12. Moreover, the power receiving terminals 210 can certainly come into contact with the power sending terminals 170 because of the spring of the power receiving terminals 210.

Since the power sending terminals 170 are provided on the inner wall of the recess of the mounting portion 12 and the power receiving terminals 210 are provided on the outer wall of the raised portion of the accessory 20c, the power receiving terminals 210 come into contact with the power sending terminals 170 as a result of mounting the accessory 20c on the mounting portion 12. Accordingly the user can readily replace the accessories 20a, 20b 20c.

Fourth Embodiment

Figure 8:
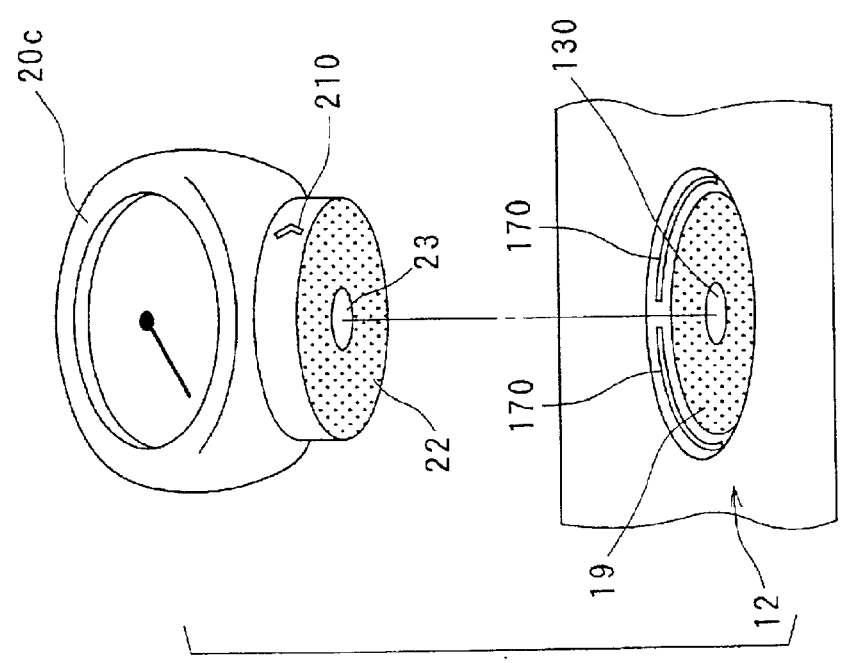
FIG. 8 is a perspective diagram showing a mounting structure according to a fourth embodiment of the present invention.

Referring to FIG. 8, amounting structure according to a fourth embodiment of the present invention includes, as a power receiving terminal and a second communication terminal, a cylindrical plug 211 on an accessory 20c, and further includes, as a power sending terminal and a first communication terminal, a jack 171 in amounting portion 12 of a cover member. The plug 211 and the jack 171 are well-known triple-pole terminals, for example, a ⌀ 3.5 mm stereo jack and a stereo plug.

The jack 171 is formed at the center of a circular recess of the mounting portion 12, and an elastic member is attached to the jack 171. The upper portion 171a of the jack 171 is a cathode terminal for power transmission. The middle portion 171b of the jack 171 is an anode terminal for power transmission. The lower portion 171c of the jack 171 is a communication terminal.

The plug 211 protrudes from the center of a disc-shaped raised portion of the accessory 20c. The upper portion 211a of the jack 211 is a cathode terminal for power transmission. The middle portion 211b of the jack 211 is an anode terminal for power transmission. The lower portion 211c of the jack 211 is a communication terminal.

When the accessory 20c is mounted on the mounting portion 12, the plug 211 is inserted into the jack 171 so that the plug 211 comes in contact with the elastic member and further the elastic member is deformed. Then power and the first, second and third control signals are transmitted to the accessory 20c via the jack 171 and the plug 211. The plug 211 is pressed against the jack 171 due to the elastic force of the elastic member, and thereby the plug 211 is certainly held in contact with the jack 171. Further the elastic member prevents the plug 211 from being accidentally disconnected from the jack 171. The accessory 20c can be mounted on the mounting portion 12 facing in an arbitrary direction, because the cylindrical plug 211 and jack 171 are provided at the center of the disc-shaped raised portion and the circular recess.

A signal converter disposed inside the instrument panel transmits a multiplex signal, which includes first, second and third control signals selected based on coded signals received from the accessories 20a, 20b, 20c, to the jack 171 in a manner similar to the first or second embodiment. Then the accessories 20a, 20b, 20c each receive the multiplex signal via the plug 211, and extract the required signal from the multiplex signal.

According to the fourth embodiment, the electrical control signals are not prone to interfere with other electrical signals, because they are not transmitted via radio waves. Further a communication system which employs the plug 211 and the jack 171 as shown in the present embodiment is inexpensive in comparison with a radio communication system.

Further according to the fourth embodiment, as a result of inserting the plug 211 into the jack 171, the accessory 20c is mounted and held on the mounting portion 12 and further all the required connections (i.e., the connection for power transmission and the connection for communication) are established. Therefore the user can readily replace the accessories 20a, 20b, 20c.

Fifth Embodiment

Figure 9:
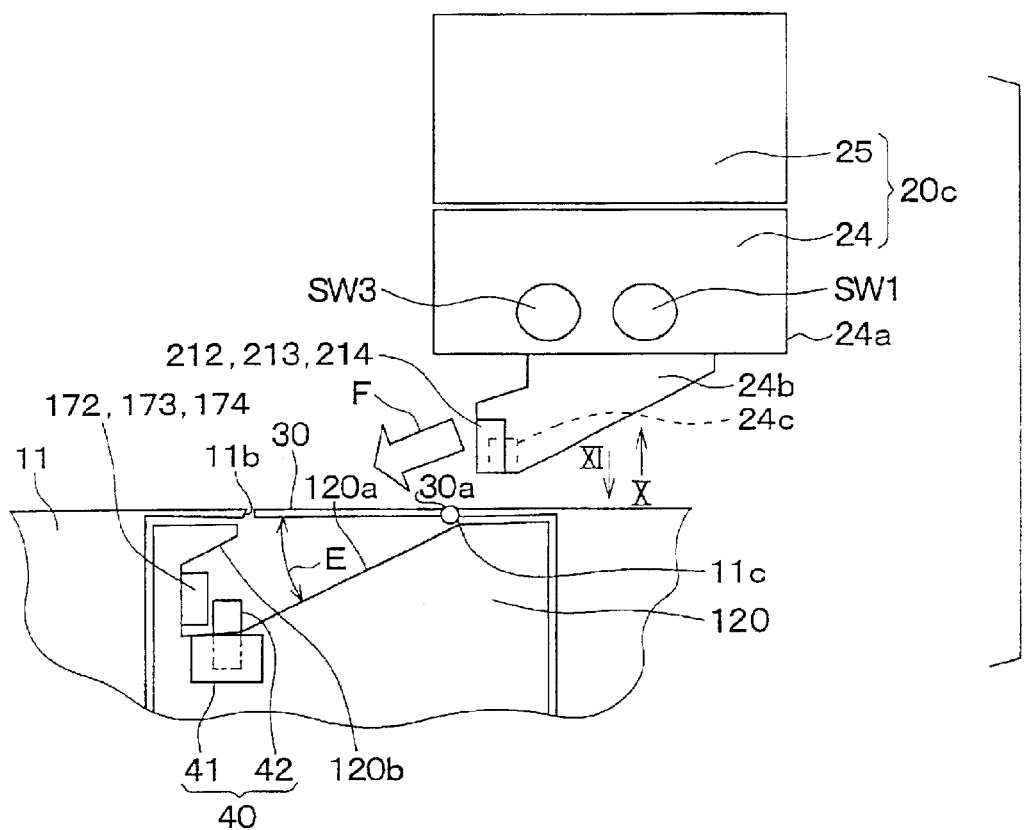
FIG. 9 is a cross section diagram showing a mounting structure according to a fifth embodiment of the present invention.

Referring to FIG. 9, a mounting structure according to a fifth embodiment of the present invention is used for mounting an accessory 20c which includes a battery charger 24 and a battery-powered device 25 on amounting portion 12 of a cover member 11. The battery-powered device 25 is detachably attached to and charged by the battery charger 24.

Figure 10:
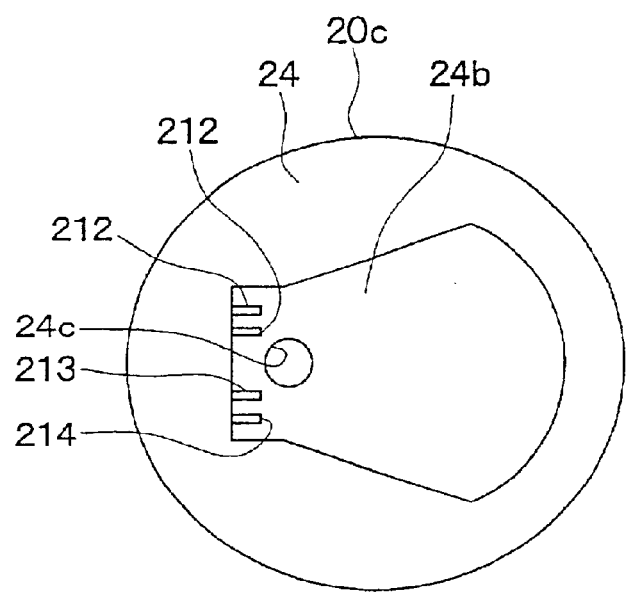
FIG. 10 is a view seen in the direction of arrow X in FIG. 9.

The battery charger 24 includes a casing 24a and an insert 24b protruding from the bottom surface of the casing 24a. A release switch SW1 and a charge mode set switch SW3 are provided on the casing 24a. The insert 24b includes a protrusion at its end as shown in FIG. 9, and further includes anode and cathode power receiving terminals 212, a communication terminal 213 and a terminal 214 for detecting disconnection from the mounting portion 12 at the end of the protrusion as shown in FIG. 10.

Figure 11:
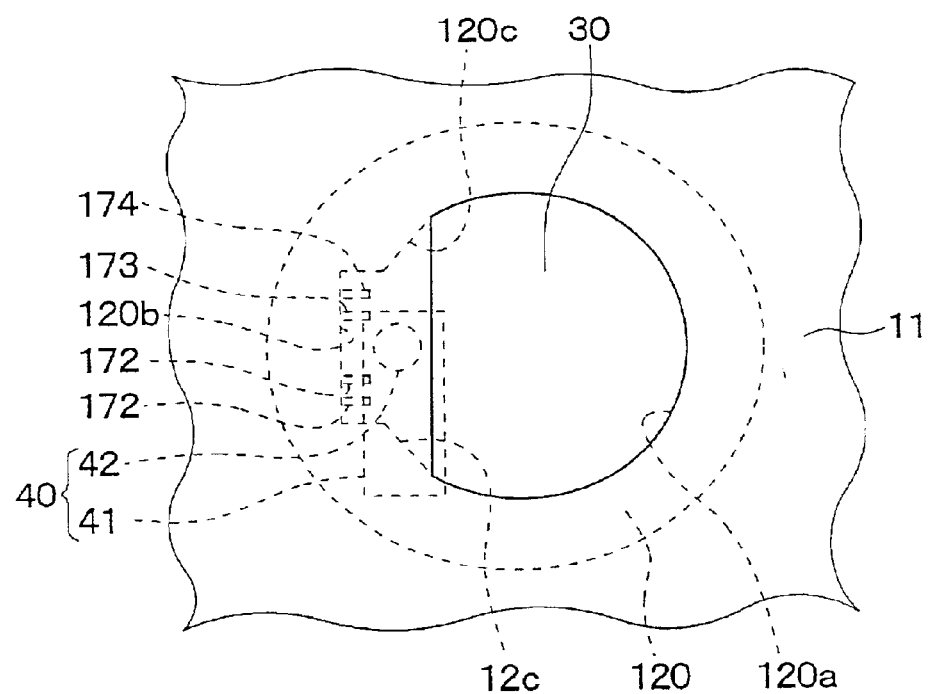
FIG. 11 is a view seen in the direction of arrow XI in FIG. 9.

The mounting portion 12 includes a generally cylindrical pedestal 120, which is embedded in and fixed to the cover member 11. A cavity 120a is formed on the top of the pedestal 120. An opening 11b corresponding to the cavity 120a is formed on the designed top surface of the cover member 11, so that the cavity 120a of the pedestal 120 communicates with the vehicle compartment through the opening 11b. The cavity 120a includes an inmost portion 120b which has a shape complementary to the shape of the protrusion of the insert 24b. The inmost portion 120b includes the terminals 172, 173, 174 corresponding to the respective terminals 212, 213, 214 of the accessory 20c, that is, anode and cathode power sending terminals 172, a communication terminal 173 and a terminal 174 for detecting disconnection of the accessory 20c as shown in FIG. 11.

The cover member 11 includes, as a part of its designed top surface, a designed cover 30 over the cavity 120a of the pedestal 120. The designed cover 30 includes a pivot 30a retained by a holder 11c of the cover member 11. The designed cover 30 is thus supported by the cover member 11 so as to be able to pivot on the pivot 30a as indicated by arrow E in FIG. 9. When the accessory 20c is not mounted on the mounting portion 12, an elastic member urges the designed cover 30 to close the opening 11b, that is, to conceal the pedestal 120.

When the accessory 20c is forced into the cavity 120a, the designed cover 30 is pushed down against the elastic force of the elastic member so that the opening 11b is open. If the insert 24b is further inserted into the cavity 120a as indicated by arrow F in FIG. 9 and pressed into the inmost portion 120b, the terminals 212, 213, 214 of the accessory 20c come in contact with the terminals 172, 173, 174 of the mounting portion 12. The pedestal 120 includes a guide 120c adjacent to the inmost portion 120b in the cavity 120a, and thereby the protrusion of the insert 24b can be readily inserted into the inmost portion 120b. Further the user does not bother to open the designed cover 30 before he/she mounts the accessory 20c in the cavity 120a.

The pedestal 120 includes an electric catching device 40, which includes a pin-type operative part 42 as a catching member and a solenoid 41 as an actuator for the operative part 42. When the accessory 20c is not mounted on the mounting portion 12, the operative part 42 is in a first position (shown by broken lines in FIG. 9), that is, it is evacuated from the cavity 120a. When the catching device 40 detects intrusion of the accessory 20c into the cavity 120a, it moves the operative part 42 into a second position (shown by soil lines in FIG. 9), that is, it projects the operative part 42 by applying a current to the solenoid 41. The projected operative part 42 fits into a hole 24c formed in the insert 24b of the accessory 20c. Thus the operative part 42 engages with the insert 24b. According to this construction, the accessory 20c is prevented from being accidentally disconnected from the pedestal 120 even when the vehicle vibrates largely or crashes.

Figure 12:
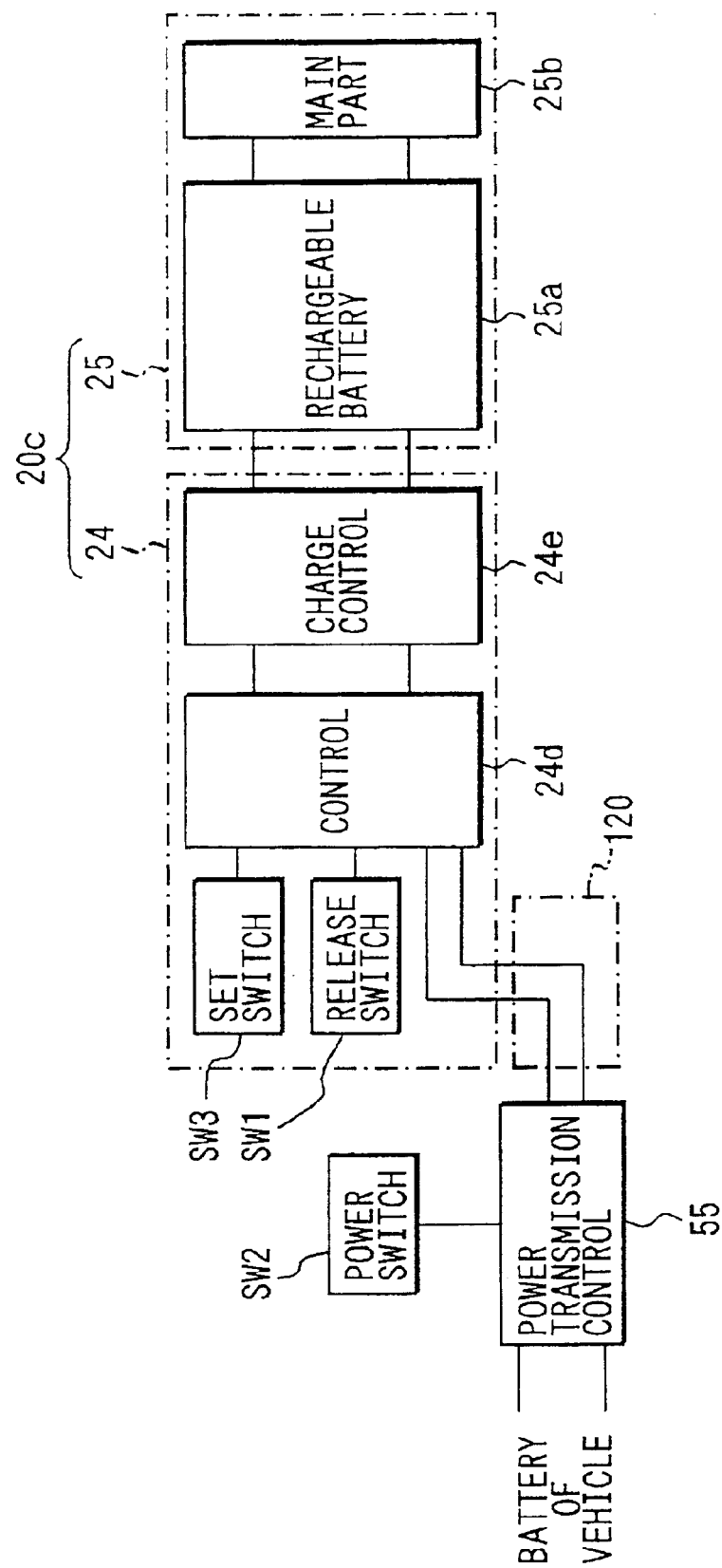
FIG. 12 is a block diagram showing a charging system for charging an accessory mounted on a mounting portion of the mounting structure according to the fifth embodiment.

Referring to FIG. 12, the battery charger 24 includes a control circuit 24d as control means, and further includes a charge control circuit 24e. The battery-powered device 25 includes a rechargeable battery 25a and a main part 25b. The terminals 172, 173, 174 of the mounting portion 12 are connected to the battery of the vehicle through a power transmission control circuit 55. When the terminals 172, 173, 174 of the mounting portion 12 are connected with the terminals 212, 213, 214 of the accessory 20c, this is detected by the power transmission control circuit 55.

When the user operates the release switch SW1 for disengaging the operative part 42 from the insert 24b, are lease signal is provided for the control circuit 24d. In response to the release signal, the control circuit 24d controls the catching device 40 so that the operative part 42 is disengaged from the insert 24b.

However, the control circuit 24d may control the catching device 40 so that the operative part 42 is disengaged from the insert 24b, only when the release signal is received from the release switch SW1 under a condition where a predetermined criterion is satisfied. In this case, the operative part 42 also acts as antitheft means if the criterion is appropriately determined. The criterion is, for example, that an antitheft device such as an immobilizer is inactive, that the accessory switch of the vehicle is ON, or that the ignition switch of the vehicle is ON. The user cannot dismount the accessory 20c from the pedestal 120 until the operative part 42 is disengaged from the insert 24b.

Figure 13:
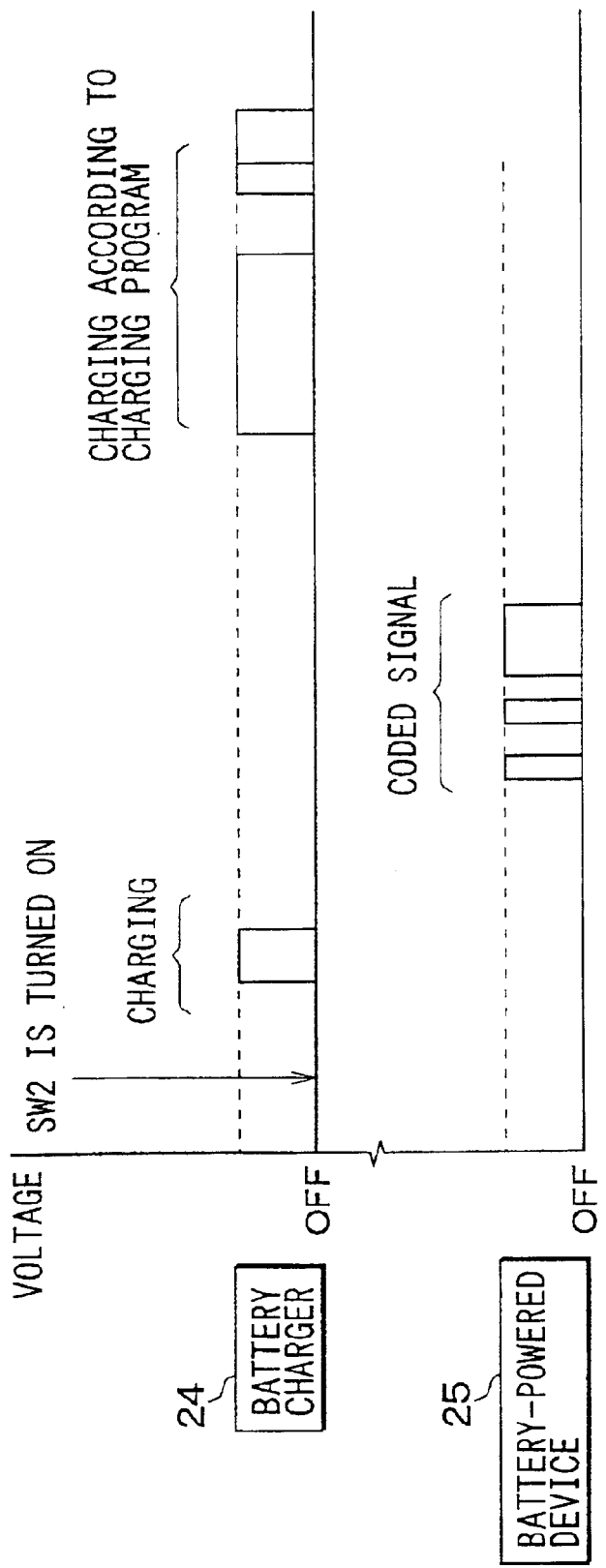
FIG. 13 is a timing diagram of the operation of the charging system of FIG. 12.

Referring to FIG. 13, if the user turns on a power switch SW2 connected to the power transmission control circuit 55 when the terminals 172, 173, 174 of the mounting portion 12 are connected to the terminals 212, 213, 214 of the accessory 20c, the control circuit 24d and the charge control circuit 24e of the battery charger 24 supply electricity to the battery-powered device 25 for a fixed length of time. Then the rechargeable battery 25a of the battery-powered device 25 accumulates the supplied electricity, and transmits a coded signal as an identification signal. The coded signal is transmitted via the power receiving and sending terminals 212, 172. However, an output terminal and an input terminal for transmitting the coded signal may be provided on the accessory 20c and the mounting portion 12, respectively. The coded signal indicates to the control circuit 24d of the battery charger 24 that the battery-powered device 25 is a device powered by a rechargeable battery.

Thereafter the control circuit 24d of the battery charger 24 identifies the type of the accessory 20c based on the coded signal, and controls the charge control circuit 24e according to a charging program appropriate for identified type of the accessory 20c. The charging program provides a switching frequency and a duty cycle appropriate for the accessory 20c. Further the charging program appropriately switches between an intermittent mode and a continuous mode based on the coded signal according to the type of the accessory 20c.

In the intermittent mode, electricity is supplied to the battery-powered device 25 intermittently so that the life of the rechargeable battery 25a is prolonged. In the continuous mode, electricity is supplied to the battery-powered device 25 continuously so that the rechargeable battery 25a is charged rapidly. Thus the charge control circuit 24e charges the battery-powered device 25 according to the charging program.

The user can change the charging scheme, which is automatically determined by the control circuit 24d of the battery charger 24, using the charge mode set switch SW3, if necessary. That is, the user can switch the battery charger 24 between the intermittent mode and the continuous mode using the charge mode set switch SW3. Further the user can adjust the switching frequency or the duty cycle using the charge mode set switch SW3. When the quantity of electricity supplied to the battery-powered device 25 reaches a predetermined value, the charge control circuit 24 ends the supply of electricity so that overcharge is prevented.

According to the present embodiment, the battery charger 24 determines a scheme for charging the accessory 20c based on the coded signal, and therefore it does not supply electricity to the accessory 20c until it receives one of predetermined coded signals from the accessory 20c. Accordingly, abnormality is prevented, even when a battery-powered device and the battery charger 24 are mismatched or an accessory which does not comply with the specification of the mounting portion 12 is mounted on the mounting portion 12.

In the present embodiment, the pedestal 120 is fixed to cover member 11. However, the pedestal 120 may be supported by the cover member 11 so as to be pivotable on its vertical axis. In this case, if the user turns the accessory 20c, it pivots along with the pedestal 120. Thus the user can turn accessory 20c around so that the accessory 20c faces in the desired direction.

The insert 24 of the accessory corresponds to a convex portion of the electrical device of the present invention, and the inmost portion 120b of the mounting portion 12 corresponds to a concave portion of the mounting portion.

Sixth Embodiment

Figure 14:
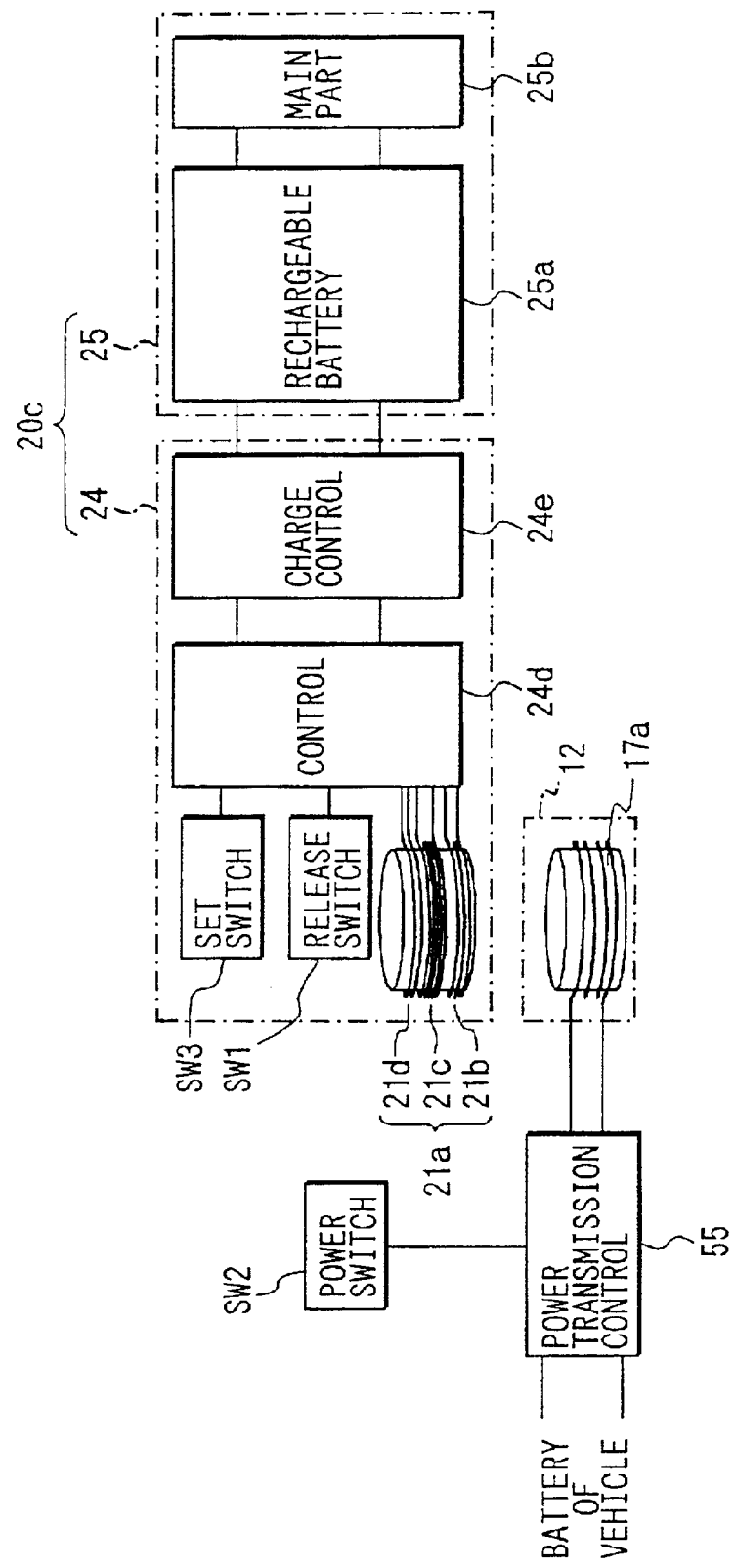
FIG. 14 is a block diagram showing a charging system for charging an accessory mounted on a mounting portion of a mounting structure according to a sixth embodiment of the present invention.

Referring to FIG. 14, a mounting structure according to a sixth embodiment of the present invention is also used for mounting an accessory 20c which includes a battery charger 24 and a battery-powered device 25 on a mounting portion 12 of a cover member. The mounting structure includes non-contact type power sending and receiving terminals similar to those employed by the mounting structure according to the first embodiment.

The power sending terminal of the mounting portion 12 includes a primary coil 17a connected to a power transmission control circuit 55, while the power receiving terminal of the battery charger 24 includes a secondary coil 21a connected to a control circuit 24d of the battery charger 24. The secondary coil 21a includes a plurality of coils 21b, 21c, 21d which are severally connected to the control circuit 24d and differ in the number of turns included therein. The mounting portion 12 is connected to the battery of the vehicle in a manner similar to the fifth embodiment. Further the mounting portion 12 includes communication means 13, 130 similar to that included in the mounting portion 12 according to the first or second embodiment.

The control circuit 24d has the capability to measure the voltage of a rechargeable battery 25a of the battery-powered device 25 before it begins to charge the rechargeable battery 25a, and the capability to measure the charging current. The control circuit 24d determines a proper voltage applied to the rechargeable battery 25a of the battery-powered device 25 based on the measured voltage of the battery-powered device 25. Then the control circuit 24d selects one of the coils 21b, 21c, 21d based on the proper voltage, and then the proper voltage is applied to the rechargeable battery 25a.

When the measured voltage is almost zero, that is, the rechargeable battery 25a is fully discharged, the control circuit 24d selects a coil that provides the lowest voltage from the coils 21b, 21c, 21d. Thereafter the control circuit 24d switches to a coil that provides higher voltage, if the measured charging current vanishes in a predetermined length of time. Thus the control circuit 24d is prevented from applying a voltage higher than the proper voltage to the rechargeable battery 25a.

In this way, the battery charger 24 can adapt to change in the proper voltage to be applied to the accessory 20c. Further accessories which differ in the proper voltage may be alternately mounted on the same mounting portion and charged. That is, the accessories can share the battery charger 24, and thereby the total number of battery chargers that should be installed in the vehicle compartment is reduced.

In the present embodiment, contact type power sending and receiving terminals similar to those employed by the mounting structure according to the fifth embodiment may be employed instead of the non-contact type power sending and receiving terminals. In this case, the above-described advantages are also provided if the battery charger 24 has the capability to control the voltage applied to the rechargeable battery 25a.

In the present embodiment, the control circuit 24d adjusts the voltage applied to the rechargeable battery 25a by selecting one of the coils 21b, 21c, 21d. However, the control circuit 24 may control the current applied to the rechargeable battery 25a by adjusting the switching frequency and/or the duty cycle keeping the voltage constant.

Seventh Embodiment

Figure 15A:
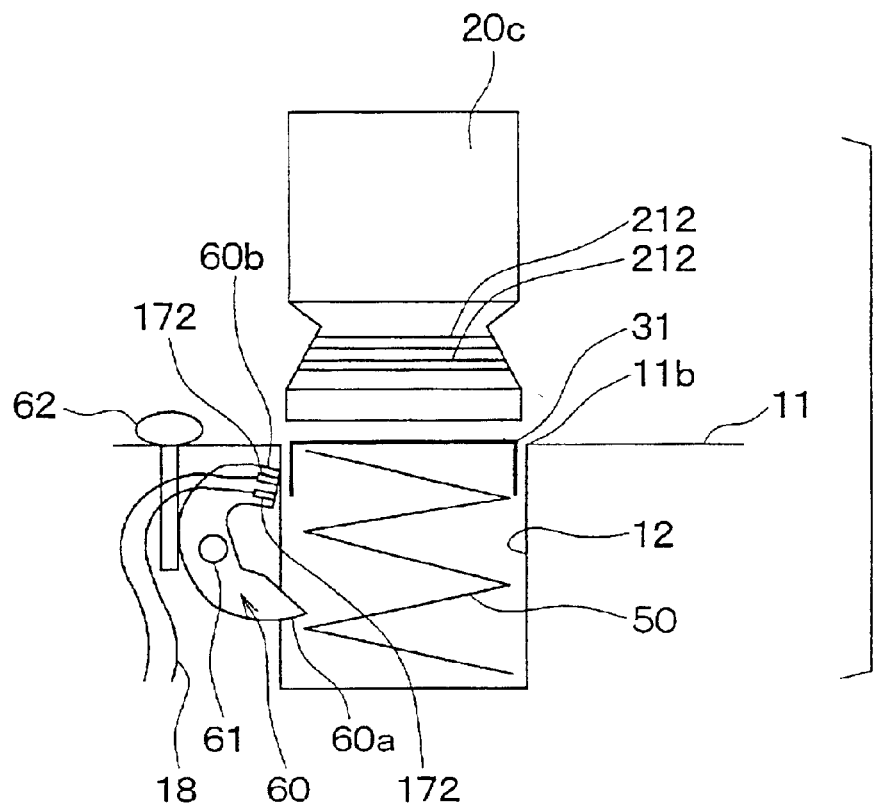
FIGS. 15A and 15B are cross section diagrams showing amounting structure according to a seventh embodiment of the present invention.
Figure 15B:
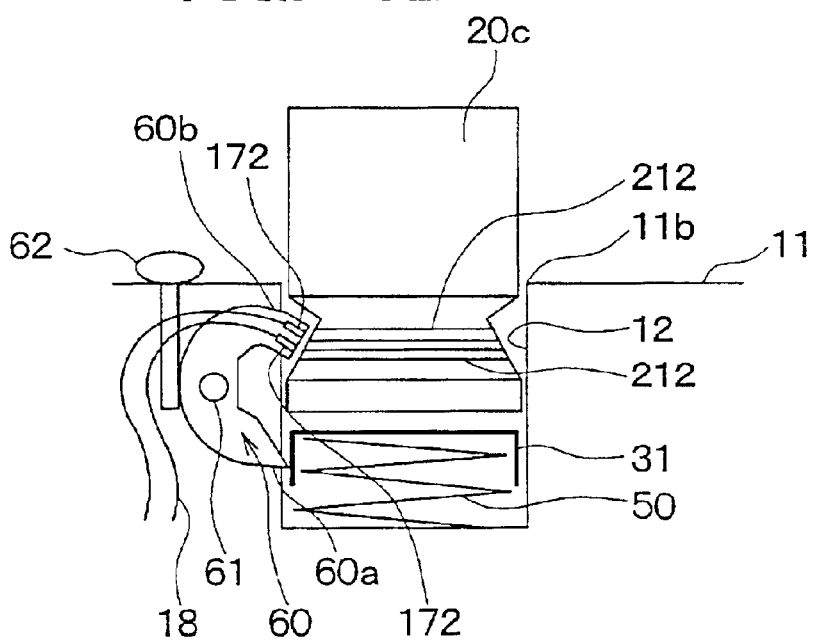

Referring to FIGS. 15A and 15B, a mounting structure according to a seventh embodiment of the present invention includes a mounting portion 12 which includes a cylindrical cavity and a link member 60. The cavity is formed in the cover member 11 so that the longitudinal axis of the cavity extends vertically. An opening 11b corresponding to the cavity is formed on the designed top surface of the cover member 11, so that the cavity communicates with the vehicle compartment through the opening 11b.

The link member 60 is pivotably supported by a pivot 61, and projects its tail end 60a into the cavity as shown in FIG. 15A. The head 60b of the link member 60 includes two power sending terminals 172, which are an anode terminal and a cathode terminal. The power sending terminals 172 are connected to the battery of the vehicle by a wire harness 18 for power transmission. Further the mounting portion 12 includes communication means 13, 130, 173 similar to that included in the mounting portion 12 according to the first, second or fifth embodiment.

A generally cylindrical accessory 20c is mounted in the mounting portion 12 so as to be partially inserted into the cavity as shown in FIG. 15B. The accessory 20c includes a waist on its circumferential surface. Two power receiving terminals 212, which are an anode terminal and a cathode terminal, are circumferentially provided on the waist of the accessory 20c.

A designed cover 31 is disposed in the cavity. An elastic member 50 disposed in the cavity biases the designed cover 31 so that the designed cover 31 is flush with the designed top surface of the cover member 11 as shown in FIG. 15A when the accessory 20c is not mounted on the mounting portion 12. When the accessory 20c is forced into the cavity, the designed cover 31 is pushed down against the elastic force of the elastic member. Then the designed cover 31 moves down keeping its surface horizontal, so that the cavity is open. Therefore the user is not required to bother to open the designed cover 31 before he/she mounts the accessory 20c on the mounting portion 12.

When the accessory 20c is further inserted into the cavity, the bottom of the accessory 20c hits the tail end 60a of the link member 60. Then the link member 60 pivots, so that the head 60b of the link member 60 projects into the cavity and engages with the waist of the accessory 20c as shown in FIG. 15B. Thereby the power sending terminals 172 of the link member 60 engage with the power receiving terminals 212 of the accessory 20c. Then power from the battery of the vehicle is transmitted to the accessory 20c. When the link member 60 engages with the accessory 20c, the link member 60 is in intimate contact with a release pin 62. Thus the link member 60 is locked, so that the accessory 20c is prevented from being accidentally dismounted from the mounting portion 12 even if the vehicle vibrates largely or crashes.

When the user dismounts the accessory 20c from the mounting portion 12, the user pulls up the release pin 62. Then the link member 60 is released, and then the accessory 20c is pushed up along with the designed cover 31 due to the elastic force of the elastic member 50. The accessory 20c pushes the head 60b of the link member 60 into the cover member 11, and thereby the link member 60 pivots so as to disengage from the accessory 20c. Thus the accessory 20c is dismounted from the mounting portion 12.

The mounting structure according to the present embodiment includes the catching member (i.e., link member) 60 which are mechanically actuated to engage with the accessory 20c, while the mounting structure according to the fifth embodiment of the present invention includes the catching member (i.e., operative part) 42 which are electrically actuated. The mechanically actuated catching member 60 is inexpensively provided in comparison with the electrically actuated catching member 42.

Eighth Embodiment

Figure 16:
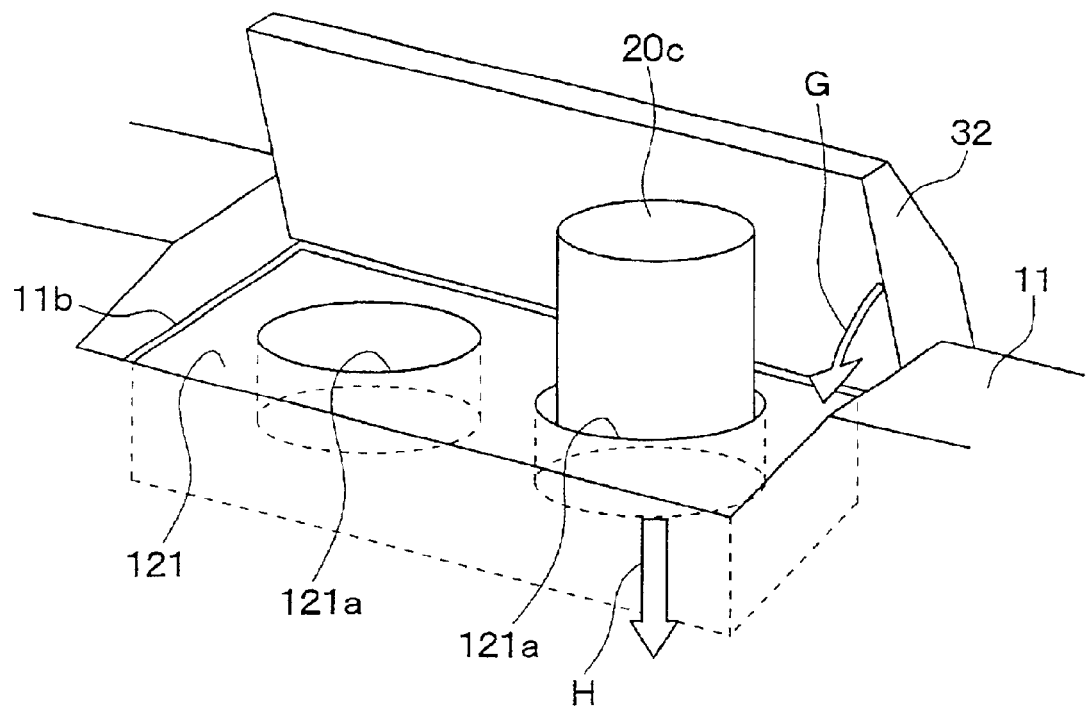
FIG. 16 is a perspective diagram showing a mounting structure according to an eighth embodiment of the present invention.
Figure 17:
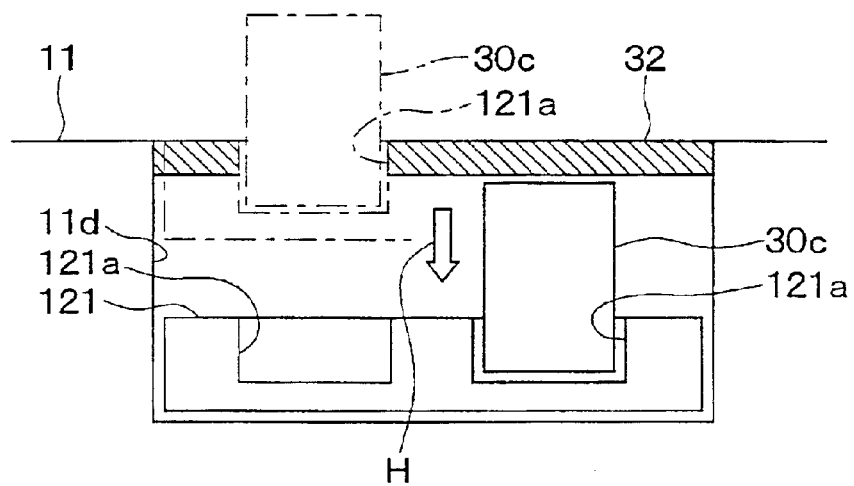
FIG. 17 is a cross section diagram showing the mounting structure according to the eighth embodiment.

Referring to FIGS. 16 and 17, a mounting structure according to an eighth embodiment of the present invention includes as a mounting portion 12 a pedestal 121 embedded in a cover member 11, and further includes a designed cover 32 pivotably supported by the cover member 11. An opening 11b is formed on the top surface of the cover member 11, and a cavity 11d corresponding to the opening 11b is formed in the cover member 11. The pedestal 121 is disposed in the cavity 11d so as to be vertically movable.

Recesses 121a for mounting accessories 20c are formed on the top surface of the pedestal 121, and non-contact type power sending terminals corresponding to the respective recesses 121a are provided in the pedestal 121. When an accessory 20c that has non-contact type power receiving terminal is mounted in the recess 121a, power from the battery of the vehicle is transmitted to the accessory 20c. Further the mounting portion 12 include communication means 13, 130 similar to that included in the mounting portion 12 according to the first or second embodiment.

When the designed cover 32 is open, the pedestal 121 and the accessory 20c mounted thereon is exposed to the vehicle compartment as shown in FIG. 16. The pedestal 121 is linked with the designed cover 32 by a linkage mechanism. Therefore, when the user closes the designed cover 32, that is, pivots the designed cover 32 as indicated by arrow G in FIG. 16, the pedestal 121 moves vertically in the direction H. When the designed cover 32 is completely closed, the pedestal 121 and the accessory 20 mounted thereon are concealed as shown in FIG. 17. Thus the accessory 20c is housed. Transmission of power to the accessory 20c is suppressed for saving of power, when the designed cover 32 is completely closed. In FIG. 17, the positions of the pedestal 121 and the accessory 20c when the designed cover 32 is open are indicated by broken lines.

According to the present embodiment, the appearance of the cover member 11 is not spoiled, since the designed cover 32 forms a part of the top surface of the cover member 11 when it is closed. Moreover the accessory 20c can be protected against theft, because the designed cover 32 conceals the accessory 20c when it is closed. The closed designed cover 32 can be opened only when a predetermined criterion is satisfied. Alternatively, the designed cover 32 may be constructed so that the alarm is sounded if the closed designed cover 32 is opened under a condition where the predetermined criterion is not satisfied. The criterion is, for example, that an antitheft device such as an immobilizer is inactive, that the accessory switch of the vehicle is ON, or that the ignition switch of the vehicle is ON. If the designed cover 32 is constructed so as to be able to be opened only when such criterion is satisfied, the accessory 20c can be securely protected against theft.

Ninth Embodiment

Figure 18:
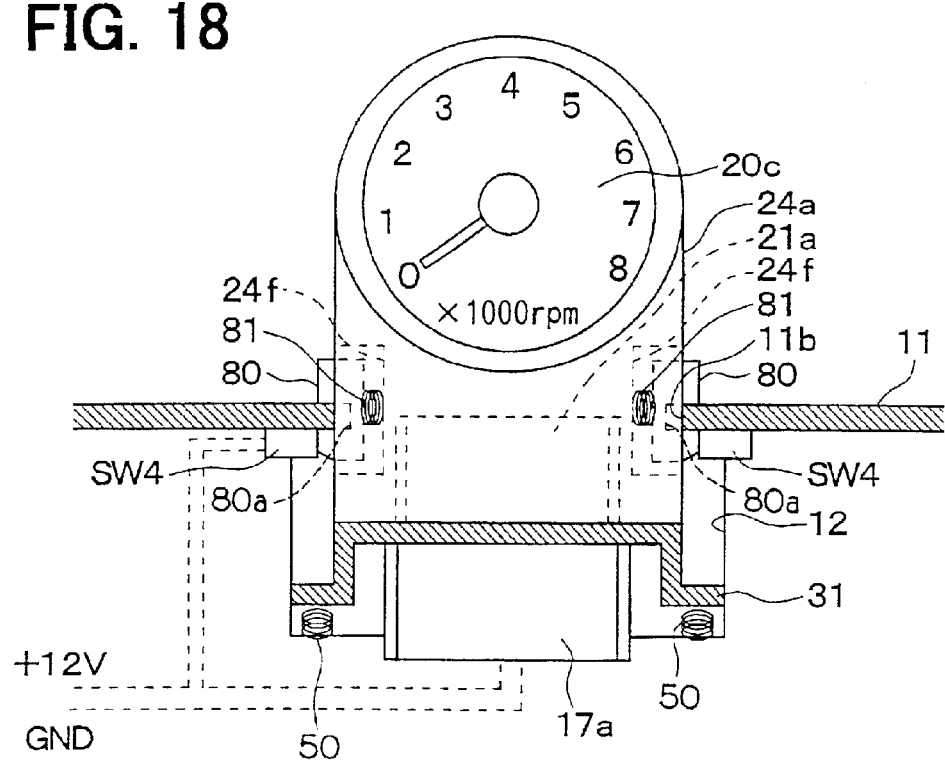
FIG. 18 is a cross section diagram showing amounting structure according to a ninth embodiment of the present invention.

Referring to FIG. 18, a mounting structure according to a ninth embodiment of the present invention includes as a mounting portion 12 a cavity formed in the cover member 11. An opening 11b corresponding to the cavity is formed on the designed top surface of the cover member 11, and the cavity communicates with the vehicle compartment through the opening 11b. An accessory 20c is mounted on the mounting portion 12 so as to be partially inserted into the cavity. The mounting portion 12 includes a primary coil 17a, while the accessory 20c includes a secondary coil 21a. The mounting portion 12 is similar to the first embodiment, and includes communication means 13, 130 similar to that included in the mounting portion 12 according to the first or second embodiment.

Two recesses 24f for accommodating catching members 80 are formed on the side wall of a casing 24a of the accessory 20c. Elastic members 81 are disposed in the respective recesses 24f, and the catching members 80 are arranged on the respective elastic members 81 in the recesses 24f. A groove 80a for engaging with the cover member 11 is formed on the outer surface of each of the catching members 80. A designed cover 31 similar to that included in the mounting structure according to the seventh embodiment is disposed in the cavity. Elastic members 50 disposed in the cavity bias the designed cover 31 so that the designed cover 31 is flush with the designed top surface of the cover member 11, when the accessory 20c is not mounted in the mounting portion 12.

When the accessory 20c is forced into the cavity, the designed cover 31 is pushed down against the elastic force of the elastic members 50. Then the designed cover 31 moves down keeping its surface horizontal, so that the cavity is open. When the accessory 20c is further inserted into the cavity, the edge (i.e., engaging portion) of the cover member 11 engages with the grooves 80a as shown in FIG. 18 and then the elastic members 81 press the catching members 80 against the edge of the cover member 11. Thereby the accessory 20c is prevented from being accidentally dismounted from the mounting portion 12.

The mounting portion 12 includes switches SW4 corresponding to the respective catching members 80. When the edge of the cover member 11 engages with the grooves 80a of the catching members 80, the switches SW4 are turned ON by the lower portions of the catching members 80 so that power from the battery of the vehicle is transmitted to the primary coil 17a of the mounting portion 12. Then the power is transmitted from the primary coil 17a to the secondary coil 21a of the accessory 20c.

According to this construction, the power is not transmitted to the accessory 20c until the accessory 20c is mounted in the mounting portion 12. Therefore, if a piece of metal such as a juice can is carelessly placed on the mounting portion 12, power is not transmitted to the primary coil 17a of the mounting portion 12 because the switches SW4 are not turned ON. That is, the power is not transmitted to the primary coil 17a of the mounting portion 12 until an accessory which has catching members 80 is mounted in the mounting portion 12. Thus abnormality is prevented.

When the user dismounts the accessory 20c from the mounting portion 12, he/she pushes the catching members 80 into the recesses 24f against the elastic force of the elastic members 81. Then the edge of the cover member 11 disengages from the grooves 80a of the catching members 80, and thereby the user can dismount the accessory 20c from the mounting portion 12.

The mounting structure according to the present embodiment includes the catching members 80 attached to the accessory 20c as described above, while the mounting structure according to the fifth, sixth or seventh embodiment includes the catching member 42, 60 attached to the mounting portion 12.

Tenth Embodiment

Figure 19:
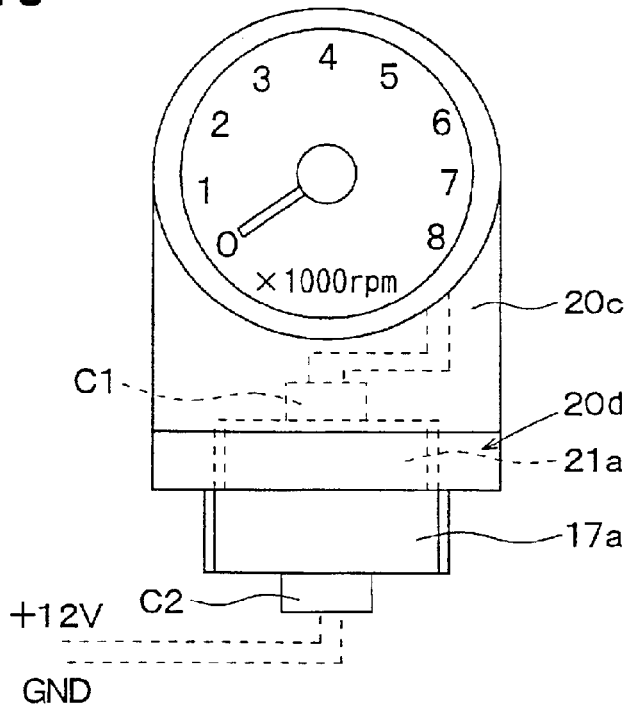
FIG. 19 is a front view of a mounting structure according to a tenth embodiment of the present invention.

Referring to FIG. 19, a mounting structure according to a tenth embodiment of the present invention includes a secondary coil connector C1 provided in an accessory 20c and a primary coil connector C2 provided in a mounting portion. A primary coil 17a is connected to the primary coil connector C2 in the mounting portion, while a secondary coil 21a is connected to the secondary coil connector C1 in the accessory 20c. The secondary coil 21a is fixed to a first bottom cover 20d of the accessory 20c. The mounting portion is similar to the first embodiment, and includes communication means 13, 130, 173 similar to that included in the mounting portion 12 according to the first embodiment.

Figure 20:
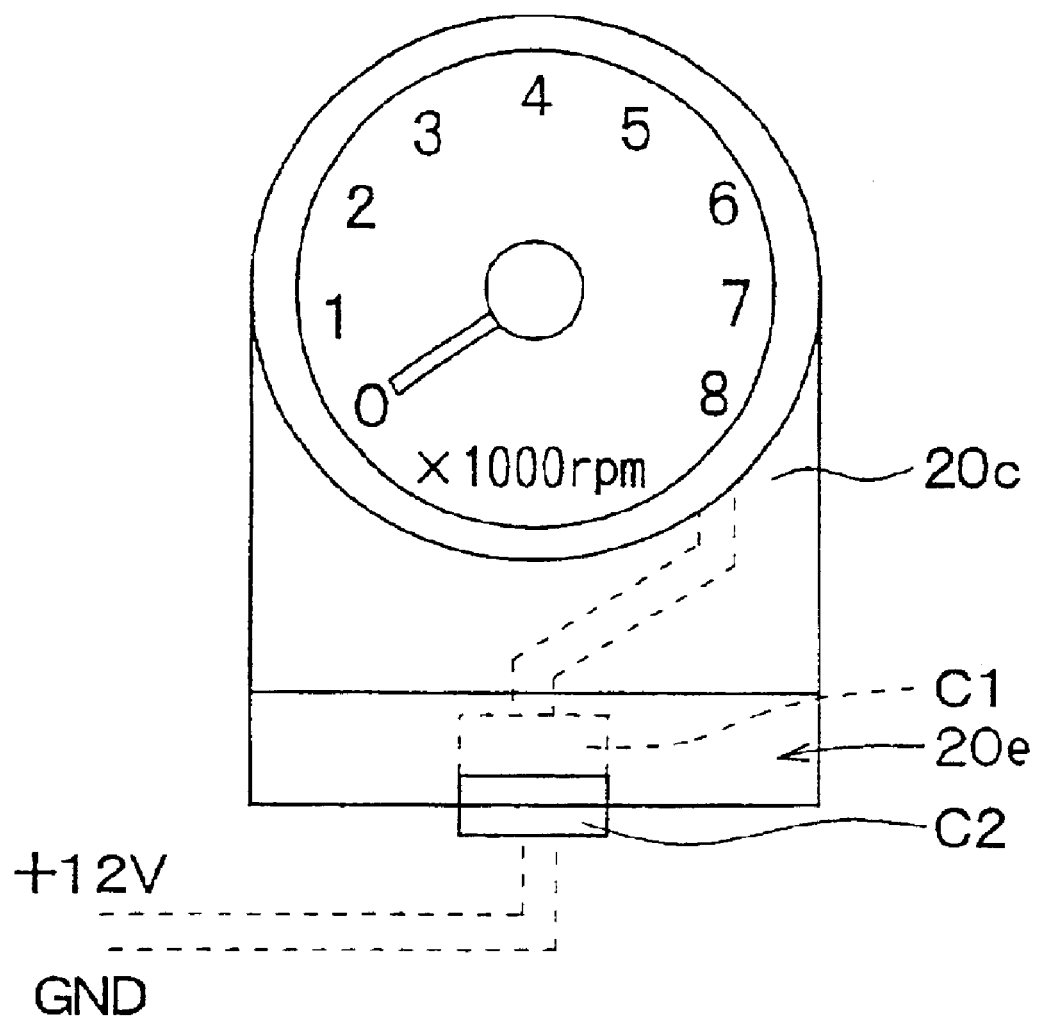
FIG. 20 is a front view of the mounting structure showing that the connector of an accessory may be directly connected to the connector of a mounting portion according to the tenth embodiment.

The primary coil 17a receives power from the battery of the vehicle via the primary coil connector C2, and then transmits the received power to the secondary coil 21a of the accessory 20c. The power is further transmitted from the secondary coil 21a to the accessory 20c via the secondary coil connector C1. However, the secondary coil connector C1 of the accessory 20c may be connected directly to the primary coil connector C2 of the mounting portion as shown in FIG. 20. Specifically, the first bottom cover 20d is replaced with a second bottom cover 20e, and thereafter the secondary coil connector C1 is fixed to the second bottom cover 20e and then connected to the primary coil connector C2. In this case, power from the battery of the vehicle can be transmitted to the accessory 20c via the connectors C2, C1.

In the case that the user once mounts the accessory 20c on the mounting portion and thereafter leaves the accessory 20c mounted on the mounting portion, that is, the accessory 20c is not dismounted from the mounting portion for a relatively long time, it is preferable that the connectors C1, C2 are directly connected. The primary and secondary coils 17a, 21a are not required to be prepared in this case, and thereby costs can be reduced.

Furthermore, the operation of an accessory which does not include a secondary coil 21a can be checked without preparing the secondary coil 21a, because the secondary coil connector C1 of the accessory can be directly connected to the primary coil connector C2 of the mounting portion. If the mounting portion originally includes the primary coil 17a connected to the primary coil connector C2, the secondary coil connector C1 of the accessory can be directly connected to the primary coil connector C2 because the primary coil 17a can be readily disconnected from the primary coil connector C2.

Eleventh Embodiment

Figure 21:
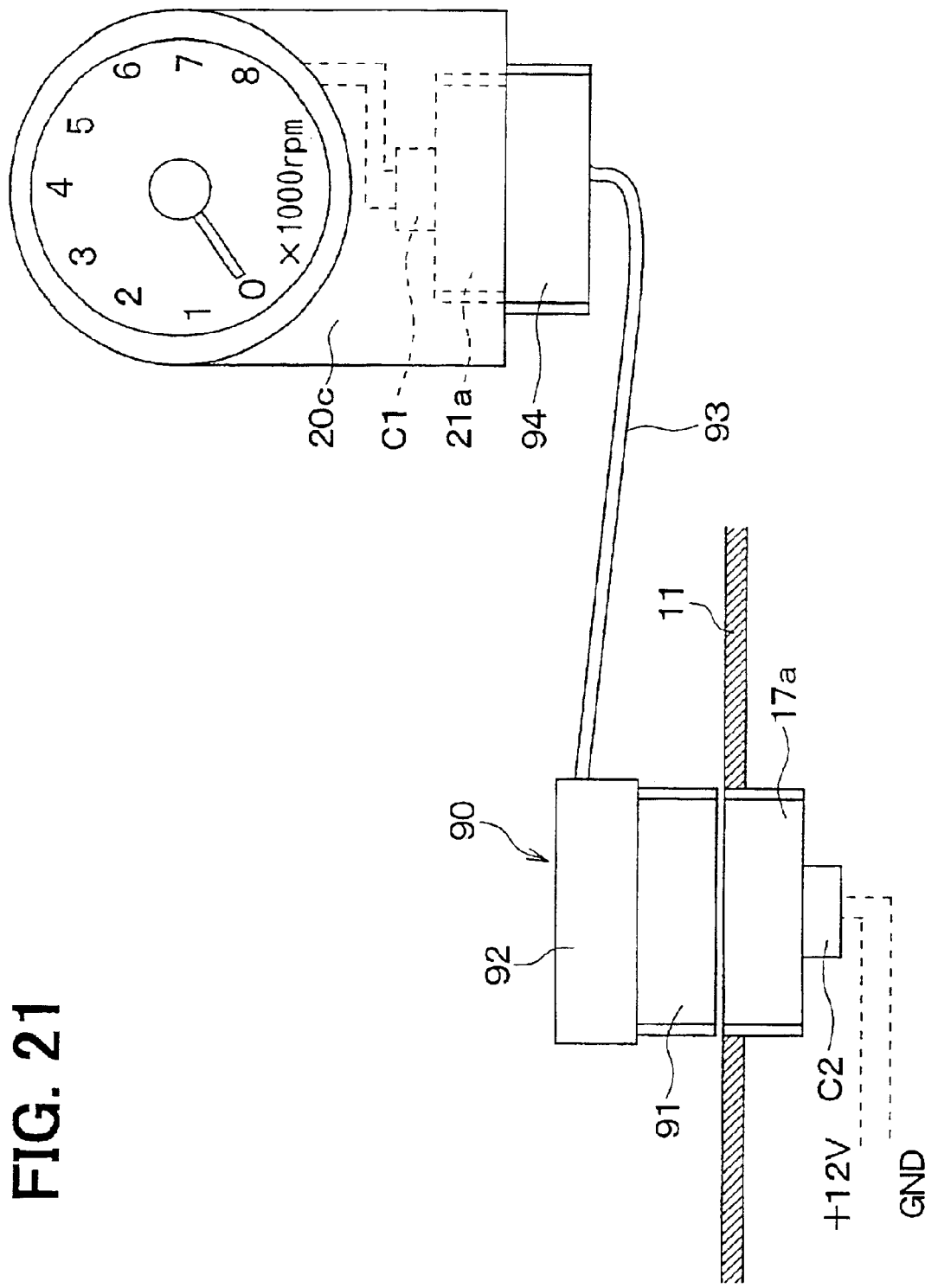
FIG. 21 is a front view of a mounting structure according to an eleventh embodiment of the present invention.

Referring to FIG. 21, a mounting structure according to an eleventh embodiment of the present invention includes primary and secondary coil connectors C2, C1 and primary and secondary coils 17a, 21a similar to those included in the mounting structure according to the tenth embodiment. A mounting portion according to the present invention is similar to the first embodiment, and includes communication means 13, 130 similar to that included in the mounting portion 12 according to the first or second embodiment. The secondary coil 21a of the accessory 20c is connected to the primary coil 17a of the mounting portion by an extension cord unit 90. The extension cord unit 90 includes a vehicle-side coil 91, a cord reel 92, an extension cord 93 and an accessory-side coil 94.

The primary coil 17a transmits power from the battery of the vehicle to the vehicle-side coil 91 of the extension cord unit 90 without touching the vehicle-side coil 91. The power is further transmitted to the accessory-side coil 94 via the extension cord 93. Then the accessory-side coil 94 transmits the power to the secondary coil 21a of the accessory 20c without touching the secondary coil 21a. The cord reel 92 is used for taking up the extension cord 93.

The accessory 20c can be placed at any position within the reach of the extension cord 93 according to the present embodiment, while the accessory 20c cannot be placed at a position other than the predetermined position according to the first to tenth embodiments.

Twelfth Embodiment

Figure 22:
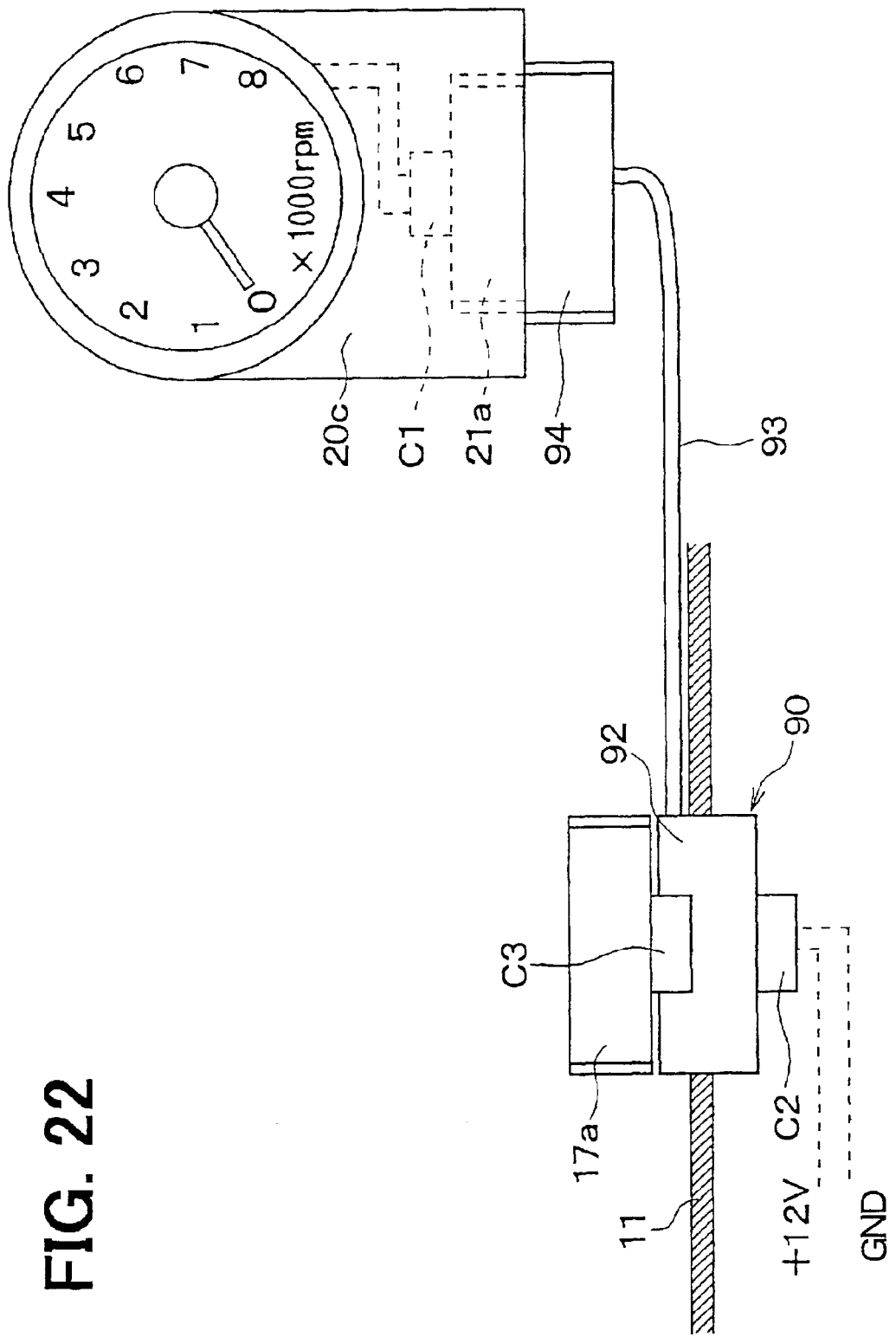
FIG. 22 is a front view of a mounting structure according to a twelfth embodiment of the present invention.

Referring to FIG. 22, a mounting structure according to a twelfth embodiment of the present invention includes primary and secondary coil connectors C2, C1 and a secondary coil 21a similar to those included in the mounting structure according to the tenth or eleventh embodiment. A mounting portion according to the present invention is similar to the first embodiment, and includes communication means 13, 130, 173 similar to that included in the mounting portion according to the first, second, or fifth embodiment. The secondary coil 21a of the accessory 20c is connected to the primary coil connector C2 of the mounting portion by an extension cord unit 90.

The extension cord unit 90 includes a cord reel 92, an extension cord 93, an accessory-side coil 94 and a complementary connector C3 attached to the cord reel 92. That is, the extension cord unit 90 does not include a vehicle-side coil 91, which is included in the extension cord unit 90 according to the eleventh embodiment. Accordingly, the cord reel 92 of the extension cord unit 90 is directly connected to the primary coil connector C2 according to the present embodiment. A primary coil 17a is connectable to the complementary connector C3 of the extension cord unit 90.

The accessory 20c connected to the mounting portion by the extension cord 93 can be placed at any position within the reach of the extension cord 93. The accessory 20c can be also mounted on the primary coil 17a connected to the complementary connector C3 of the extension cord unit 90. Therefore, when the accessory 20c is connected to the mounting portion by the extension cord unit 90 as shown in FIG. 22, another accessory may be connected to the primary coil 17a connected to the complementary connector C3. That is, two accessories can be connected to one mounting portion at a time according to the present embodiment.

Thirteenth Embodiment

Figure 23:
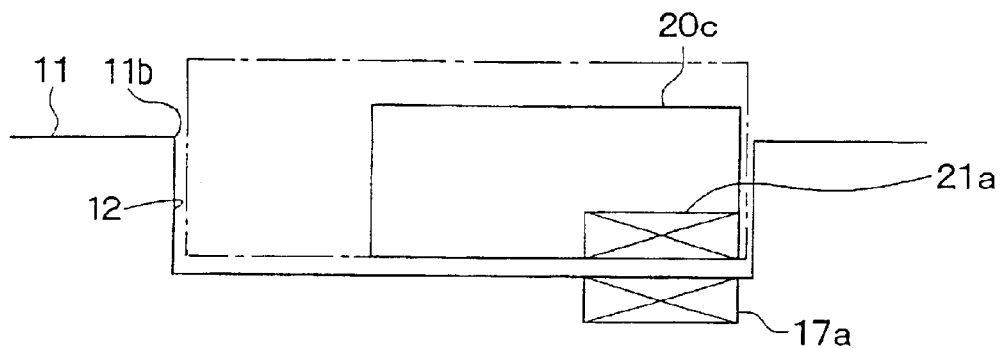
FIG. 23 is across section diagram showing amounting structure according to a thirteenth embodiment of the present invention.

Referring to FIG. 23, a mounting structure according to a thirteenth embodiment of the present invention includes as a mounting portion 12 a cavity formed in a cover member 11. An opening 11b corresponding to the cavity is formed on the designed top surface of the cover member 11, and the cavity communicates with the vehicle compartment through the opening 11b. Further the mounting portion 12 includes communication means 13, 130 similar to that included in the mounting portion 12 according to the first or second embodiment. A user mounts an accessory 20c on the mounting portion by placing it in the cavity.

The mounting portion 12 includes a primary coil 17a on one side, while the accessory 20c includes a secondary coil 21a on the side corresponding to the primary coil 17a. The mounting portion 12 and the accessory 20c are constructed so that the secondary coil 21a of the accessory 20c is placed opposite to the primary coil 17a of the mounting portion 12 when the accessory 20c is mounted on the mounting portion 12. The primary coil 17a transmits power from the battery of the vehicle to the secondary coil 21a without touching the secondary coil 21a.

The mounting structure according to the present embodiment does not include a designed cover or a catching member, while the mounting structure according to the ninth embodiment includes the designed cover 31a, the catching member 80, the elastic members 50, 81 for biasing the designed cover and a catching member 80, and the power switch SW4 to be turned on by the catching member 80. Therefore, according to the present embodiment, not only an accessory (shown by broken lines in FIG. 23) that fits the cavity but also a smaller accessory 20c (shown by solid lines in FIG. 23) can be mounted in the mounting portion 12.

Figure 24:
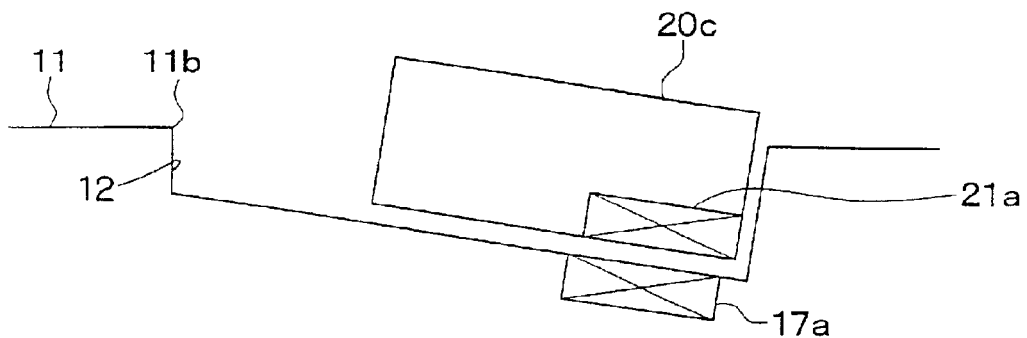
FIG. 24 is a cross section diagram showing amounting structure according to a modification of the thirteenth embodiment.

The bottom of the cavity may incline to the side on which the primary coil 17a is placed as shown in FIG. 24. In this case, the user is not required to place the accessory 20c exactly in the correct position, because the accessory 20c is surely moved to the correct position by gravitation. Therefore the user can mount the accessory 20c in the cavity more readily.

Fourteenth Embodiment

Figure 25:
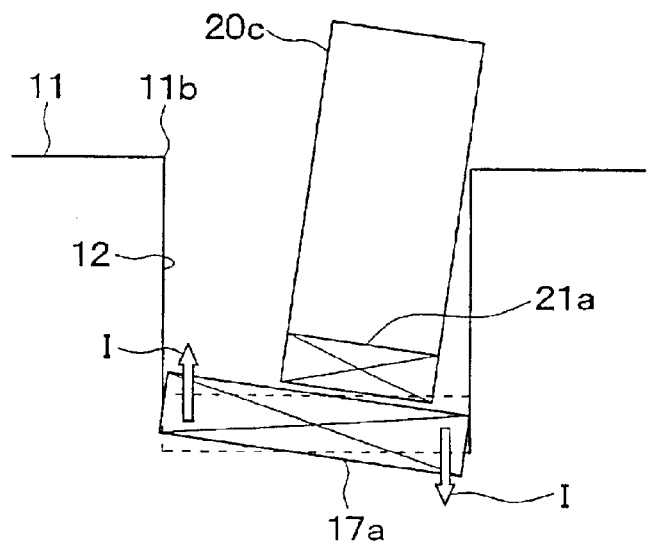
FIG. 25 is a cross section diagram showing amounting structure according to a fourteenth embodiment of the present invention.

Referring to FIG. 25, a mounting structure according to a fourteenth embodiment of the present invention includes an adjustable primary coil 17a in a mounting portion 12 and a secondary coil 21a in an accessory 21c. Further the mounting portion 12 includes communication means 13, 130 similar to that included in the mounting portion 12 according to the first or second embodiment. The primary coil 17a can be inclined and further its inclination is adjustable as indicated by arrows I in FIG. 25. Thereby an accessory 20c smaller than an accessory that fits the mounting portion 12 can be mounted in the mounting portion 12 reclining against the inner wall of the mounting portion 12. In this case, the secondary coil 21a of the accessory 20c is arranged parallel to the primary coil 17a of the mounting portion 12 so that power from the battery of the vehicle may be efficiently transmitted to the accessory 20c.

Figure 26:
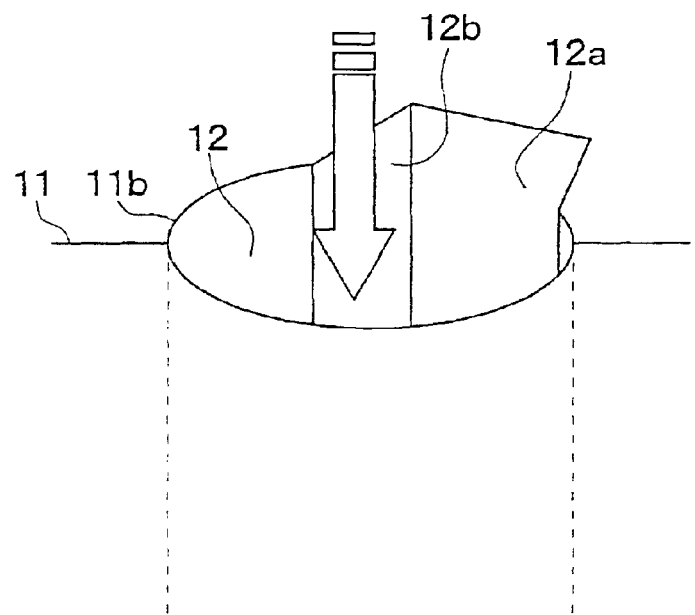
FIG. 26 is a perspective diagram showing a mounting structure according to a modification of the fourteenth embodiment.
Figure 27:
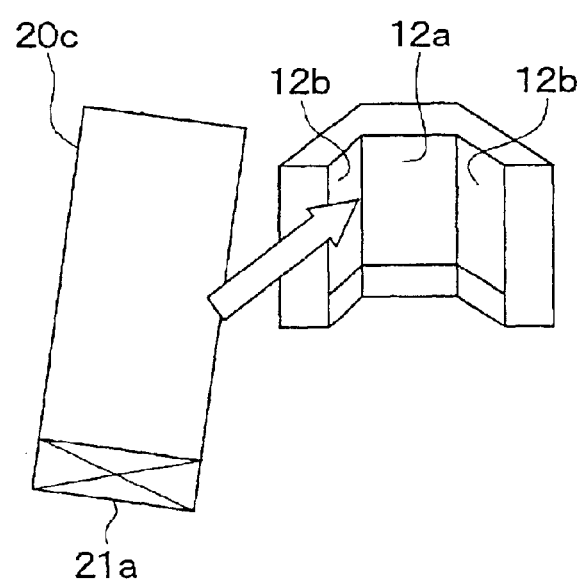
FIG. 27 is a perspective diagram showing how an accessory is mounted on a mounting portion of the mounting structure of FIG. 26.

The mounting portion 12 may include a tapered holding portion 12a as shown in FIGS. 26 and 27. The accessory 20c is mounted in the mounting portion 12 reclining against the holding portion 12a in this case. Then the side walls 11b of the holding portion 12a hold the accessory 20c in position.

Modifications

In the first to fourth embodiments, the mounting structure includes a plurality of mounting portions 12. However, the mounting structure may include only one mounting portion 12. Further a solar battery, a dry-cell battery or a storage battery may be installed in the accessory 20c, and the installed battery may be used as a power source for supplying power to the accessory 20c instead of the battery of the vehicle.

In the first to third embodiments, the fastener members 19, 22 made of the faster tape are employed for fixing the accessory 20c to the mounting portion 12. However, the mounting portion 12 may include an electromagnetic coil which acts as an electromagnet when the accessory 20c is mounted on the mounting portion 12. The accessory 20c mounted on the mounting portion 12 is fixed to the mounting portion 12 by the electromagnetic force of the electromagnetic coil in this case. Further, conventional mechanical resinous fixtures, which enable the user to mount the accessory 20c in a single procedure, may be employed for fixing the accessory 20c to the mounting portion 12 instead of the fastener members 19, 22.

In the first to fourteenth embodiments, the mounting structure may be used for mounting an accessory 20c on an interior member other than the instrument panel 10. That is, the mounting structure may be used for mounting an accessory 20c on, for example, an armrest, a door, or an interior member disposed around the rear seat. The mounting structure according to the above embodiments is suitable especially for mounting an accessory 20c on a designed interior member disposed in the vehicle compartment.

The present invention is not limited to the above embodiment and modifications, but may be variously embodied within the scope of the invention.

What is claimed is:

1. A mounting structure for at least one vehicle electrical device comprising:
a mounting portion on which said one vehicle electrical device is mounted, said mounting portion being disposed on an interior member in a vehicle compartment and including communication means for transmitting a first electrical signal received from a vehicle to said one vehicle electrical device, wherein:
said first electrical signal is a multiplex signal which includes a plurality of control signals, each control signal of said plurality of control signals controlling a respective one of a plurality of vehicle electrical devices;

said communication means is connected to a signal converter to which wiring for transferring a second electrical signal other than said first electrical signal from said vehicle is connected;

said signal converter extracts said plurality of control signals from said second electrical signals and multiplexes said extracted plurality of control signals into said first electrical signal; and said communication means receives said first electrical signal from said signal converter.

2. A mounting structure as in claim 1, wherein said interior member is an instrument panel and said mounting portion is arranged on a top surface of said instrument panel.

3. A mounting structure as in claim 2, wherein said instrument panel includes a detachable cover member on its top surface and said mounting portion is arranged on said cover member.

4. A mounting structure as in claim 1, wherein said mounting portion includes mounting means which enables a user to mount said one vehicle electrical device on said mounting portion in a single procedure.

5. A mounting structure as in claim 1, wherein said mounting portion is one of a plurality of mounting portions each of which is disposed on said interior member and includes communication means for transmitting said first electrical signal to an electrical device mounted thereon.

6. A mounting structure as in claim 5, wherein said signal converter is a single signal converter which alone transmits said first electrical signal to said communication means of said plurality of mounting portions.

7. A mounting structure as in claim 5, wherein said communication means of each of said plurality of mounting portions performs two-way communication with an electrical device mounted thereon.

8. A mounting structure as in claim 1, wherein said communication means performs wireless communication with said one vehicle electrical device utilizing an electromagnetic wave.

9. A mounting structure as in claim 8, wherein said electromagnetic wave is infrared light.

10. A mounting structure as in claim 1, wherein said communication means is a contact-type first communication terminal which communicates with a second communication terminal provided in said one vehicle electrical device touching said second communication terminal.

11. A mounting structure as in claim 10, wherein:
one of said first communication terminal and said second communication terminal includes an elastic member; and
when said one vehicle electrical device is mounted on said mounting portion, said elastic member touches the other of said first communication terminal and said second communication terminal while deformed so that said second communication terminal is pressed against said first communication terminal by an elastic force of said elastic member.

12. A mounting structure as in claim 10, wherein said second communication terminal is connected to said first communication terminal as a result of mounting said one vehicle electrical device on said mounting portion.

13. A mounting structure as in claim 10, wherein said second communication terminal is a cylindrical plug and said first communication terminal is a jack into which said plug is inserted.

14. A mounting structure as in claim 1, wherein said mounting portion includes non-contact type power transmission means which transmits power from a battery of the vehicle to said one vehicle electrical device without touching said one vehicle electrical device.

15. A mounting structure as in claim 14, wherein said non-contact type power transmission means has a circular surface opposite to said one vehicle electrical device which is mounted on said mounting portion.

16. A mounting structure as in claim 14, wherein:
transmission of power to said one vehicle electrical device is suppressed based on at least one of a first criterion and a second criterion;
said first criterion is that an amount of power consumed by said non-contact type power transmission means is equal to or larger than a predetermined upper threshold; and
said second criterion is that the amount of power consumed by said non-contact type power transmission means is equal to or less than a predetermined lower threshold.

17. A mounting structure as in claim 14, wherein said mounting portion includes control means for controlling, based on a proper voltage or said one vehicle electrical devices, an amount of power transmitted to said one vehicle electrical device which is mounted on said mounting portion.

18. A mounting structure as in claim 17, wherein said control means receives an identification signal from said one vehicle electrical device and controls the amount of power transmitted to said one vehicle electrical device based on said identification signal.

19. A mounting structure as in claim 18, wherein said control means suppresses transmission of power to said one vehicle electrical device when said identification signal is not received from said one vehicle electrical device.

20. A mounting structure as in claim 1, wherein said mounting portion includes a power sending terminal which transmits power from a battery of the vehicle to a power receiving terminal included in said one vehicle electrical device touching said power receiving terminal.

21. A mounting structure as in claim 20, wherein:
one of said power sending terminal and said power receiving terminal includes an elastic member; and
when said one vehicle electrical device is mounted on said mounting portion, said elastic member touches the other of said power sending terminal and said power receiving terminal while deformed so that said power receiving terminal is pressed against said power sending terminal by an elastic force of said elastic member.

22. A mounting structure as in claim 20, wherein said power receiving terminal is connected to said power sending terminal as a result of mounting said one vehicle electrical device on said mounting portion.

23. A mounting structure as in claim 20, wherein:
said mounting portion is a cavity formed on a designed surface of said interior member;
a user mounts said one vehicle electrical device on said mounting portion by partially inserting said one vehicle electrical device into said cavity; and
said power receiving terminal is annularly formed on said one vehicle electrical device around an axis which extends in a longitudinal direction of said cavity.

24. A mounting structure as in claim 20, wherein:
said mounting portion includes a link member;
said one vehicle electrical device actuates said link member by pressing said link member when said one vehicle electrical device is mounted on said mounting portion; and said power sending terminal touches said power receiving terminal after said link member is actuated.

25. A mounting structure as in claim 20, wherein:
said one vehicle electrical device has a casing from which a convex portion protrudes and said convex portion includes said power receiving terminal;
said mounting portion includes a concave portion which has a shape complementary to a shape of said convex portion and said concave portion includes said power sending terminal;
said power receiving terminal is properly connected to said power sending terminal as a result of inserting said convex portion into said concave portion; and
said mounting portion includes a guide adjacent to said concave portion for guiding said convex portion into said concave portion.

26. A mounting structure as in claim 20, wherein said mounting portion includes control means for controlling, based on a proper voltage of said one vehicle electrical device, an amount of power transmitted to said one vehicle electrical device which is mounted on said mounting portion.

27. A mounting structure as in claim 26, wherein:
said control means receives an identification signal from said one vehicle electrical device; and
said control means controls the amount of power transmitted to said one vehicle electrical device based on said identification signal.

28. A mounting structure as in claim 27, wherein said control means suppresses transmission of power to said one vehicle electrical device when said identification signal is not received from said one vehicle electrical device.

29. A mounting structure as in claim 27, wherein said identification signal is transmitted from said one vehicle electrical device to said control means via said power receiving terminal and said power sending terminal.

30. A mounting structure as in claim 27, wherein:
said mounting portion includes an input terminal other than said power sending terminal for receiving said identification signal;
said one vehicle electrical device includes an output terminal other than said power receiving terminal for transmitting said identification signal; and
said output terminal transmits said identification signal to said input terminal touching said input terminal.

31. A mounting structure as in claim 1, wherein said mounting portion includes a catching member which is engagable with said one vehicle electrical device and movable so as to be disengagable from said one vehicle electrical device.

32. A mounting structure as in claim 31 further comprising a release switch which outputs a release signal when a user operates said release switch for disengaging said catching member from said one vehicle electrical device, wherein said catching member is moved so as to disengage from said one vehicle electrical device in response to said release signal.

33. A mounting structure as in claim 31, wherein said catching member is disengaged from said one vehicle electrical device only if a predetermined criterion is satisfied, so that said one vehicle electrical device is protected against theft.

34. A mounting structure as in claim 31, wherein disengagement of said catching member from said one vehicle electrical device is suppressed based on at least one of an operating state of an antitheft device installed on the vehicle and a status of power supply to the vehicle.

35. A mounting structure as in claim 31, wherein:
said one vehicle electrical device includes a catching member;
said interior member includes an engaging portion which engages with said catching member of said one vehicle electrical device; and
said catching member is movable so as to be disengagable from said engaging portion.

36. A mounting structure as in claim 1, wherein:
said interior member includes a designed cover which covers said mounting portion and forms a part of a designed surface of said interior member;
said designed cover is movable between an open position and a closed position; and
said mounting portion is open when said designed cover is in the open position and closed when said designed cover is in the closed position.

37. A mounting structure as in claim 36, wherein:
said mounting portion is a cavity formed on the designed surface of said interior member;
a user mounts said one vehicle electrical device on said mounting portion by partially inserting said one vehicle electrical device into said cavity; and
said designed cover moves in a longitudinal direction of said cavity keeping its surface perpendicular to the longitudinal direction of said cavity so that said mounting portion is open, when the user presses said one vehicle electrical device against said designed cover for mounting said one vehicle electrical device on said mounting portion.

38. A mounting structure as in claim 36, wherein:
said designed cover includes a pivot pivotably supported by said interior member; and
said designed cover moves between the open position and the closed position by pivoting said pivot.

39. A mounting structure as in claim 36, wherein:
said designed cover further covers said one vehicle electrical device; and
when said designed cover is in the closed position, movement of said designed cover is suppressed based on at least one of an operating state of an antitheft device installed on the vehicle and a status of power supply to the vehicle.

40. A mounting structure as in claim 1, wherein said one vehicle electrical device is mounted on said mounting portion facing in an arbitrary direction with reference to a predetermined axis.

41. A mounting structure as in claim 1, wherein said mounting portion and said one vehicle electrical device mounted on said mounting portion are pivotable as one on a predetermined axis.

42. A mounting structure as in claim 40, wherein said predetermined axis extends in a vertical direction.

43. A mounting structure as in claim 41, wherein said predetermined axis extends in a vertical direction.

44. A mounting structure comprising:
an electrical device; and
a mounting portion on which said electrical device is mounted, said mounting portion being disposed on an interior member in a vehicle compartment and including communication means for transmitting an electrical signal received from a vehicle to said electrical device, wherein:
said electrical signal is a multiplex signal which includes a plurality of control signals, each control signal of said plurality of control signals controlling a respective one of a plurality of vehicle electrical devices;

said communication means is connected to a signal converter to which wiring for transferring a second electrical signal other than said first electrical signal from said vehicle is connected;

said signal converter extracts said plurality of control signals from said second electrical signals and multiplexes said extracted plurality of control signals into said first electrical signal; and said communication means receives said first electrical signal from said signal converter.

45. A mounting structure for at least one vehicle electrical device comprising:

a mounting portion on which the electrical device is mounted, said mounting portion being disposed on an interior member in a vehicle compartment and including communication means for transmitting a first electrical signal received from a vehicle to said one vehicle electrical device, wherein:

said mounting portion includes non-contact type power transmission means which transmits power from a battery of the vehicle to said vehicle electrical device without touching said vehicle electrical device, and wherein said power transmission means includes a primary coil and a secondary coil with a spacing therebetween of less than 3 mm.

46. A mounting structure as in claim 45, wherein:

said mounting portion is a cavity formed on a designed surface of said interior member;

said one vehicle electrical device is mountable on said mounting portion by partially inserting said one vehicle electrical device into said cavity; and said primary coil is covered with a fabric fastener tape disposed on said mounting portion so that said primary coil is not exposed to said vehicle compartment.

47. A mounting structure as in claim 46, wherein:

said one vehicle electrical device has a circular convex shape facing said mounting portion; and an annular resinous fastener tape is disposed around said secondary coil disposed an underside of said convex shape.

48. A mounting structure as in claim 45, wherein:

said communication means is connected to a signal converter to which wiring for transferring a second electrical signal other than said first electrical signal from said vehicle is connected;

said signal converter extracts said plurality of control signals from said second electrical signals and multiplexes said extracted plurality of control signals into said first electrical signal; and said communication means receives said first electrical signal from said signal converter.

49. A mounting structure as in claim 48, wherein said mounting portion is one of a plurality of mounting portions each of which is disposed on said interior member and includes communication means for transmitting said first electrical signal to an electrical device mounted thereon.

50. A mounting structure as in claim 49, wherein said signal converter is a single signal converter which alone transmits said first electrical signal to said communication means of said plurality of mounting portions.

51. A mounting structure as in claim 49, wherein said communication means of each of said plurality of mounting portions performs two-way communication with an electrical device mounted thereon.

52. A mounting structure as in claim 45, wherein:

said mounting portion includes control means for controlling, based on a proper voltage of said one vehicle electrical device, an amount of power transmitted to said one vehicle electrical device which is mounted on said mounting portion;

said control means receives an identification signal from said one vehicle electrical device and controls the amount of power transmitted to said one vehicle electrical device based on said identification signal; and said control means suppresses transmission of power to said one vehicle electrical device when said identification signal is not received from said one vehicle electrical device.

53. A mounting structure as in claim 45, wherein:

said interior member includes a designed cover which covers said mounting portion and forms a part of a designed surface of said interior member;

said designed cover is movable between an open position and a closed position;

said mounting portion is open when said designed cover is in the open position and closed when said designed cover is in the closed position; and said designed cover further covers said one vehicle electrical device.

54. A mounting structure as in claim 53, wherein:

when said designed cover is in the closed position, movement of said designed cover is suppressed based on at least one of an operating state of an antitheft device installed on the vehicle and a status of power supply to the vehicle.

55. A mounting structure as in claim 54, wherein:

an alarm is sounded if said designed cover is opened under a condition that a predetermined condition is not satisfied.

56. A mounting structure for at least one vehicle electrical device comprising:

a mounting portion on which the electrical device is mounted, said mounting portion being disposed on an interior member in a vehicle compartment and including communication means for transmitting a first electrical signal received from a vehicle to said one vehicle electrical device, wherein:

said first electrical signal is a multiplex signal which includes a plurality of control signals, each signal of said plurality of signals controlling a respective one of a plurality of vehicle electrical devices;

said mounting portion includes a power sending terminal which transmits power from a battery of the vehicle to a power receiving terminal included in said one vehicle electrical device touching said power receiving terminal;

said mounting portion is a cavity formed on a designed surface of said interior member;

a user mounts said one vehicle electrical device on said mounting portion by partially inserting said one vehicle electrical device into said cavity; and said power receiving terminal is annularly formed on said one vehicle electrical device around an axis which extends in a longitudinal direction of said cavity.

57. A mounting structure for at least one vehicle electrical device comprising:

a mounting portion on which the electrical device is mounted, said mounting portion being disposed on an interior member in a vehicle compartment and including communication means for transmitting a first electrical signal received from a vehicle to said one vehicle electrical device, wherein:
said first electrical signal is a multiplex signal which includes a plurality of control signals, each signal of said plurality of signals controlling a respective one of a plurality of vehicle electrical devices;
said mounting portion includes a power sending terminal which transmits power from a battery of the vehicle to a power receiving terminal included in said one vehicle electrical device touching said power receiving terminal;
said mounting portion includes a link member;
said electrical device actuates said link member by pressing said link member when said one vehicle electrical device is mounted on said mounting portion; and
said power sending terminal touches said power receiving terminal after said link member is actuated.

58. A mounting structure for at least one vehicle electrical device comprising:
a mounting portion on which the electrical device is mounted, said mounting portion being disposed on an interior member in a vehicle compartment and including communication means for transmitting a first electrical signal received from a vehicle to said one vehicle electrical device, wherein:
said first electrical signal is a multiplex signal which includes a plurality of control signals, each signal of said plurality of signals controlling a respective one of a plurality of vehicle electrical devices;
said mounting portion includes a power sending terminal which transmits power from a battery of the vehicle to a power receiving terminal included in said one vehicle electrical device touching said power receiving terminal;
said one vehicle electrical device has a casing from which a convex portion protrudes and said convex portion includes said power receiving terminal;
said mounting portion includes a concave portion which has a shape complementary to a shape of said convex portion and said concave portion includes said power sending terminal;
said power receiving terminal is properly connected to said power sending terminal as a result of inserting said convex portion into said concave portion; and
said mounting portion includes a guide adjacent to said concave portion for guiding said convex portion into said concave portion.

59. A mounting structure for at least one vehicle electrical device comprising:
a mounting portion on which the electrical device is mounted, said mounting portion being disposed on an interior member in a vehicle compartment and including communication means for transmitting a first electrical signal received from a vehicle to said one vehicle electrical device, wherein:
said first electrical signal is a multiplex signal which includes a plurality of control signals, each signal of said plurality of signals controlling a respective one of a plurality of vehicle electrical devices;
said mounting portion includes a power sending terminal which transmits power from a battery of the vehicle to a power receiving terminal included in said one vehicle electrical device touching said power receiving terminal;
said mounting portion includes control means for controlling, based on a proper voltage of said one vehicle electrical device, an amount of power transmitted to said one vehicle electrical device which is mounted on said mounting portion;
said control means receives an identification signal from said one vehicle electrical device;
said control means controls the amount of power transmitted to said one vehicle electrical device based on said identification signal;
said mounting portion includes an input terminal other than said power sending terminal for receiving said identification signal;
said one vehicle electrical device includes an output terminal other than said power receiving terminal for transmitting said identification signal; and
said output terminal transmits said identification signal to said input terminal touching said input terminal.

60. A mounting structure for at least one vehicle electrical device comprising:
a mounting portion on which the electrical device is mounted, said mounting portion being disposed on an interior member in a vehicle compartment and including communication means for transmitting a first electrical signal received from a vehicle to said one vehicle electrical device, wherein:
said first electrical signal is a multiplex signal which includes a plurality of control signals, each signal of said plurality of signals controlling a respective one of a plurality of vehicle electrical devices;
said mounting portion includes a catching member which is engagable with said one vehicle electrical device and movable so as to be disengagable from said one vehicle electrical device; and
said mounting structure further comprising a release switch which outputs a release signal when a user operates said release switch for disengaging said catching member from said one vehicle electrical device, wherein said catching member is moved so as to disengage from said one vehicle electrical device in response to said release signal.

61. A mounting structure for at least one vehicle electrical device comprising:
a mounting portion on which the electrical device is mounted, said mounting portion being disposed on an interior member in a vehicle compartment and including communication means for transmitting a first electrical signal received from a vehicle to said one vehicle electrical device, wherein:
said first electrical signal is a multiplex signal which includes a plurality of control signals, each signal of said plurality of signals controlling a respective one of a plurality of vehicle electrical devices;
said interior member includes a designed cover which covers said mounting portion and forms a part of a designed surface of said interior member;
said designed cover is movable between an open position and a closed position;
said mounting portion is open when said designed cover is in the open position and closed when said designed cover is in the closed position;
said mounting portion is a cavity formed on the designed surface of said interior member;

a user mounts said one vehicle electrical device on said mounting portion by partially inserting said one vehicle electrical device into said cavity; and said designed cover moves in a longitudinal direction of said cavity keeping its surface perpendicular to the longitudinal direction of said cavity so that said mounting portion is open, when the user presses said one vehicle electrical device against said designed cover for mounting said one vehicle electrical device on said mounting portion.

* * * * *